(12) United States Patent
Lugtigheid

(10) Patent No.: US 12,103,849 B2
(45) Date of Patent: *Oct. 1, 2024

(54) METHOD, DEVICE AND FUEL FOR HYDROGEN GENERATION

(71) Applicant: H2FUEL-SYSTEMS B.V., Voorschoten (NL)

(72) Inventor: Gerardus Wilhelmus Lugtigheid, Spijkenisse (NL)

(73) Assignee: H2FUEL-SYSTEMS B.V., Voorschoten (NL)

( * ) Notice: Subject to any disclaimer, the term of this patent is extended or adjusted under 35 U.S.C. 154(b) by 128 days.

This patent is subject to a terminal disclaimer.

(21) Appl. No.: 17/536,676

(22) Filed: Nov. 29, 2021

(65) Prior Publication Data
US 2022/0081288 A1    Mar. 17, 2022

Related U.S. Application Data

(60) Continuation of application No. 16/662,663, filed on Oct. 24, 2019, now Pat. No. 11,220,427, which is a
(Continued)

(30) Foreign Application Priority Data

| Jan. 27, 2009 | (NL) | 1036471 |
| Nov. 11, 2009 | (NL) | 1037461 |
| Jan. 11, 2010 | (NL) | 1037618 |

(51) Int. Cl.
*C01B 3/06* (2006.01)
*B67D 7/04* (2010.01)

(52) U.S. Cl.
CPC ............ *C01B 3/065* (2013.01); *B67D 7/04* (2013.01); *Y02E 60/36* (2013.01)

(58) Field of Classification Search
None
See application file for complete search history.

(56) References Cited

U.S. PATENT DOCUMENTS

| 3,346,506 A | 10/1967 | Beumel |
| 3,980,280 A | 9/1976 | Benson |

(Continued)

FOREIGN PATENT DOCUMENTS

| CN | 1524312 A | 8/2004 |
| CN | 1913207 A | 2/2007 |

(Continued)

OTHER PUBLICATIONS

Duffin, et al., "Electronic Structure of Aqueous Borohydride: a Potential Hydrogen Storage Medium", Physical Chemistry Chemical Physics (PCCP), 2011, p. 17077-17083.
(Continued)

*Primary Examiner* — Wayne A Langel
(74) *Attorney, Agent, or Firm* — Tucker Ellis LLP

(57) ABSTRACT

A method and a device for generating of hydrogen are provided with which an instantaneous release of hydrogen in considerable amounts is possible. The method comprises a one or two step mixing including injecting the fuel and an activator fluid into a reaction chamber. The device is adapted to be operated with such a method. Further, a fuel suitable for the use with such a method is provided, the fuel being based on a dry metal hydride or a dry metal borohydride being dispersed in a non-aqueous dispersion medium. Moreover, a method for (re-) fueling the hydrogen generating device at a service station and a method for supplying a service station with fuel are provided.

26 Claims, 8 Drawing Sheets

Related U.S. Application Data division of application No. 15/368,138, filed on Dec. 2, 2016, now Pat. No. 10,486,966, which is a continuation of application No. 14/160,392, filed on Jan. 21, 2014, now Pat. No. 9,540,238, which is a continuation of application No. 13/146,622, filed as application No. PCT/NL2010/000014 on Jan. 27, 2010, now Pat. No. 8,636,975.

(56) References Cited

U.S. PATENT DOCUMENTS

| | | | |
|---|---|---|---|
| 4,302,217 | A | 11/1981 | Teitel |
| 5,542,398 | A | 8/1996 | Marcon |
| 5,560,710 | A | 10/1996 | Klocke et al. |
| 6,745,801 | B1 | 6/2004 | Cohen et al. |
| 6,802,875 | B1 | 12/2004 | Kimbara et al. |
| 7,052,671 | B2 | 5/2006 | McClaine et al. |
| 7,784,501 | B2 | 8/2010 | Gershtein et al. |
| 7,784,502 | B2 | 8/2010 | Gershtein et al. |
| 8,307,863 | B2 | 11/2012 | Noujima et al. |
| 8,807,180 | B2 | 8/2014 | O'Connor |
| 9,054,354 | B2 | 6/2015 | Baldini et al. |
| 11,220,427 | B2 * | 1/2022 | Lugtigheid ............ C01B 3/065 |
| 2009/0272588 | A1 | 11/2009 | Ryu et al. |
| 2009/0304558 | A1 | 12/2009 | Patton et al. |
| 2010/0025880 | A1 | 2/2010 | Ano et al. |
| 2013/0251626 | A1 | 9/2013 | Wallace et al. |

FOREIGN PATENT DOCUMENTS

| | | |
|---|---|---|
| CN | 1914757 A | 2/2007 |
| CN | 101008366 A | 8/2007 |
| CN | 101315053 A | 12/2008 |
| EP | 1375419 A2 | 5/2004 |
| RU | 2233511 C1 | 7/2004 |
| WO | 0185606 A1 | 11/2001 |
| WO | 02066369 A1 | 8/2002 |
| WO | 2007096857 A1 | 8/2007 |
| WO | 2008144038 A1 | 11/2008 |

OTHER PUBLICATIONS

McClaine et al., "Hydrogen Transmission/Storage with Metal Hydride-Organic Slurry and Advanced Chemical Hydride/Hydrogen for PEMFC Vehicles", Proceedings of the 2000 U.S. DOE Hydrogen Program Review, 2000, 14 pages.

Tegeder, et al., "Thermoelectricity", 2005, 12 pages.

Breault, et al., "Hydrogen Transmission/Storage with a Metal Hydride/Organic Slurry," Proceedings of the 1998 U.S. DOE Hydrogen Program Review, vol. Session 06, No. 5, Jan. 1, 1999, pp. 393-402, 20 pages.

Eurasion Search Report mailed Jul. 21, 2017 for 201790053, 4 pages.

* cited by examiner

METHOD, DEVICE AND FUEL FOR HYDROGEN GENERATION

CLAIM OF PRIORITY

This application is a continuation of and claims priority to U.S. patent application Ser. No. 16/662,663, entitled "METHOD, DEVICE AND FUEL FOR HYDROGEN GENERATION" by Gerardus Wilhelmus Lugtigheid filed on Oct. 24, 2019, which is a divisional of and claims priority to U.S. patent application Ser. No. 15/368,138, entitled "METHOD, DEVICE AND FUEL FOR HYDROGEN GENERATION" by Gerardus Wilhelmus Lugtigheid, filed on Dec. 2, 2016, now U.S. Pat. No. 10,486,966 issued on Nov. 26, 2019, which is a continuation of and claims priority to U.S. patent application Ser. No. 14/160,392, entitled "METHOD, DEVICE AND FUEL FOR HYDROGEN GENERATION" by Gerardus Wilhelmus Lugtigheid, filed on Jan. 21, 2014, now U.S. Pat. No. 9,540,238 issued on Jan. 10, 2017, which is a continuation of and claims priority to U.S. patent application Ser. No. 13/146,622, entitled "METHOD, DEVICE AND FUEL FOR HYDROGEN GENERATION" by Gerardus Wilhelmus Lugtigheid, filed on Jul. 27, 2011, now U.S. Pat. No. 8,636,975, issued on Jan. 28, 2014, which is a 371 of International Patent Application No. PCT/NL2010/000014 filed on Jan. 27, 2010, the entireties of which are incorporated herein by reference.

TECHNICAL FIELD

The present invention relates to a method and a device for generating hydrogen from a fluid fuel comprising a metal hydride MH, and/or a metal borohydride $M(BH_4)_x$. Moreover, the invention relates to a (re-) fueling method for a hydrogen generation device.

DESCRIPTION

Several processes are known to generate hydrogen from a fuel containing a metal hydride or a metal borohydride.

EP 1 369 947 discloses a hydrogen generating method in which a solution A comprising 5-50% $NaBH_4$, 5-40% NaOH and the balance water is mixed with a solution B comprising 51-100% water, and 49-0% of a water soluble water additive. Solution B has a pH preferably in the range of 2 to 7. After mixing solution A and B, the molar ratio $NaBH_4:H_2O$ preferably is larger than 1:5, or, even more preferred, larger than 1:6. Solution A and B are preferably separately metered to a reaction chamber where they are mixed and react. The decomposition reaction of borohydride is

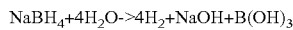

$$NaBH_4 + 4H_2O \rightarrow 4H_2 + NaOH + B(OH)_3$$

In this example, solution A is stabilized due to its alkali (NaOH), and the reaction is started by decreasing the pH of the resulting aqueous mixture when adding solution B.

The U.S. Department of Energy (DoE) defined technical targets for hydrogen delivery and storage. By 2010, the gravimetric energy capacity should be 1.8 kWh/kg. By 2015 the gravimetric energy capacity should be 3 kWh/kg=10.8 MJ/kg. The latter value corresponds to 9.0 wt.-% of hydrogen. The operating ambient temperature should be in the range of −40° C. to 60° C.

In an attempt to meet the 2010 targets, from FY 2006 Annual Progress Report, p. 377 ff., tests on a magnesium hydride ($MgH_2$) slurry made within a DoE project are reported. The tested slurry is a dispersion of $MgH_2$ particles having a size of 100 microns down to 1 micron in oils with a 70% $MgH_2$ load in the dispersion. The slurry provides a fresh material capacity of 3.6 kWh/kg. The oils of the slurry protect the $MgH_2$ from inadvertent contact with moisture in the air, and the $MgH_2$ reacts very slowly at room temperature, so it is relatively safe to handle and can be handled in the air. By adding water to the slurry and mixing it with the slurry the reaction is started.

The decomposition reaction of $MgH_2$ is:

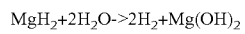

$$MgH_2 + 2H_2O \rightarrow 2H_2 + Mg(OH)_2$$

In the methods according to the prior art it appears not to be possible to induce an instantaneous reaction at which immediately after the start of the reaction hydrogen is generated in sufficient amounts for operating e.g. the hydrogen fuel cell of an automobile.

Therefore, a first object of the invention is to provide a method and a device for the generation of hydrogen with which an instantaneous release of hydrogen in considerable amounts is possible. It is a further object of the present invention to provide a fuel being suitable to be used for hydrogen production with a method and/or device according to the invention. Another object is to provide an easy method for refueling a hydrogen generating device, in particular of refueling a hydrogen generating device according to the invention.

These and other objects are solved with a method and a device for generating hydrogen, according to the invention, wherein the method comprises the steps of: providing a hydrogen carrier fluid comprising hydrogen carrier molecules or particles being dissolved or dispersed in an inert fluid medium, providing an activator fluid, injecting the hydrogen carrier fluid and the activator fluid into a first reaction chamber, wherein the hydrogen carrier fluid and the activator fluid are injected into the reaction chamber in order to cause an intensive mixing of the hydrogen carrier molecules or particles with the activator fluid.

According to the method of the invention, a solution or a liquid dispersion is used as a fuel, the solution or dispersion comprising hydrogen carrier particles, e.g. micro particles of a metal hydride or a metal borohydride, which are dissolved or dispersed in an inert fluid dissolution or dispersion medium. The fuel and the activator fluid are injected into a reaction chamber, the injection of the solution or dispersion and the activator fluid causing an intensive mixing of the fuel with the activator fluid, causing an intimate contact between the hydrogen carrier molecules and the activator fluid. The injection of a dispersion also causes the hydrogen carrier particles to be separated from the dispersion medium and to be exposed to the activator fluid. The injection of the fuel and the activator fluid is highly preferred to be an inline injection of both the fuel and the activator fluid.

With this method it is possible to obtain a large contact area between the surface of the hydrogen carrier droplets or particles and the activator fluid, and any hindrance to the reaction due to dissolution medium shielding the hydrogen carrier or dispersion medium adhering to the surface of the particles is minimized or even totally prevented since the dissolution medium will be divided into tiny droplets in the activator fluid and the dispersion medium will be washed away from the surface of the hydrogen carrier particles. Thus, after having injected both the solution or dispersion and the activator fluid into the reaction chamber, the surface of the tiny droplets or particles is exposed to the activator and the hydrogen generating reaction will start immediately and will release hydrogen at a high reaction rate.

In many cases the method will be even more efficient, when the solution or dispersion and the activator fluid are injected under high pressure, the suitable pressure, however, depending on the solution or dispersion, in particular the droplet or particle size of the hydrogen carrier, the carrier load in the solution or dispersion, the viscosity of the solution or dispersion, and the type of activator fluid used. By using high pressure for the injection of the solution or dispersion, the injection rate of the dissolution or dispersion fluid and/or the activator fluid is increased, thereby increasing the efficiency of dividing the dissolution medium into tiny droplets or separating the dispersion medium from the surface of the hydrogen carrier particles.

Moreover, the division of the dissolution medium into tiny droplets or the separation of the dispersion medium from the hydrogen carrier particle may be promoted by adding an emulsifier to the dissolution or dispersion medium and/or the activator fluid, since it eases emulsification of the dissolution medium and washing away the dispersion medium from the particle surface.

With the above measures the reaction can start in less than a second after the injection of the solution or dispersion and the activator fluid into the reaction chamber.

In a preferred embodiment, the mixture of any remaining hydrogen carrier particles, dispersion medium, and activator fluid and reaction products is additionally mixed in a second mixing stage. In that stage, the reaction between the remaining hydrogen carrying particles and the activator may be completed up to 99% or more, so that basically all the hydrogen carrier particles are reacted and the reaction products remain dispersed in the dispersion medium such that they can easily be removed from the container where they are stored. In this context, it can be advantageous to intermittently or continuously add additional activator fluid to the mixture. This second mixing stage may be preferably performed in a high shear mixer having a stator and a rotor.

It can be advantageous to employ separating means to separate hydrogen from the reaction residues, in particular a membrane, in order to release all of the generated hydrogen. Such separating means are in particular useful at and after the second mixing stage.

It is further preferred that the total amount of activator fluid slightly exceeds the stoichiometric amount for the reaction with the amount of hydrogen carrier.

A suitable hydrogen carrier is one or more selected from the group consisting of metal hydrides $MH_x$ and metal borohydrides $M(BH_4)_x$, where M is a metal and x denotes the valence of the particular metal. Preferably, the metal of the hydrogen carrier is selected from the group consisting of Li, Na, Be, Mg, Ca and Al, and the hydrogen carrier in particular preferred is $Ca(BH_4)_2$ and/or $Al(BH_4)_3$.

In order to provide a large surface area for reaction, particle sizes of the hydrogen carrier of 10 microns or smaller, preferably of about 1 micron or smaller are considered to be advantageous. Completely dissolved hydrogen carriers are considered to be particularly advantageous.

As inert dissolution or dispersion mediums, fluids or a combination of fluids selected from the group consisting of mineral oils, copolymers of ethylene and propylene, poly(alpha)olefins and ether alkoxylates are preferred.

The use of a solution or a dispersion having a concentration of the hydrogen carrier, or hydrogen carrier particles in the dispersion, of at least 60% is preferred in order to secure a suitable energy capacity. A concentration in the range of 70 to 75% seems to give an advantageous balance between energy capacity, the viscosity of the solution or dispersion and protection of the hydrogen carrier against unintentional reaction under ambient conditions. However, depending on the hydrogen carrier or the particle size of the hydrogen carrier, also higher concentrations may be suitable.

The viscosity of the solution or dispersion is critical insofar as an efficient injection is more difficult at higher viscosities. The power required for a fuel pump also is proportional to the viscosity of the fuel pumped and the power input to any pump may be used as a quality control parameter throughout the entire product chain. Thus, viscosities of from 1 to 50 times that of water at room temperature, preferably of 1 to 25 times that of water at room temperature, more preferably of from 1 to 10 times that of water at room temperature, even more preferred of from 1 to 5 times that of water at room temperature, and most preferred of from 1 to 2 times that of water at room temperature are considered to be advantageous.

A preferred activator is or comprises mainly water. The reaction rate between a hydrogen carrier and water may dramatically increase with the purity of the water. For some borohydrides it was found out that the reaction rate increases in the following order of type of water used: tap water<demineralised water<demineralised water treated with reverse osmosis<demineralised water treated with reverse osmosis and subsequently passed through an electrostatic filter.

Alcohols, such as methanol, ethanol and propanol may also be used as suitable activator fluids.

In particular when using water it is useful to add an anti-freeze agent, in particular glycol in order to decrease its freezing point. The addition of an anti-freeze agent is not necessary when using an alcohol as an activator fluid. Alternatively heating and/or insulating means may be provided to prevent water from freezing.

The device of the invention comprises a reaction chamber, at least one fuel injector for injecting a fuel and an activator fluid into the reaction chamber, and outlets for hydrogen and for the reaction residues. The at least one injector of the device of the invention is adapted to induce an immediate hydrogen generating reaction in the reaction chamber when injecting the fuel and the activator fluid.

The device of the invention preferably comprises:
 a fuel pump upstream of the fuel injector; and/or
 a fuel compartment which is in fluid connection with the fuel injector; and/or
 an activator fluid pump upstream of the activator fluid injector; and/or
 an activator fluid compartment which is in fluid connection with the activator fluid injector; and/or
 a second stage mixer, in particular a high shear mixer; and/or
 a spent fuel pump for the reaction residues downstream of the reaction chamber; and/or
 a spent fuel compartment for the reaction residues downstream of the reaction chamber.

A second stage mixer, when used, is preferably arranged within the reaction chamber, in particular at the bottom of the reaction chamber, where the dispersion medium, the fuel and the spent fuel as well as activator fluid gather after having been injected into the reaction chamber. However, a second stage mixer can also be located in a second reaction chamber downstream of the first reaction chamber. A second stage mixer is not used when the fuel is a solution.

Separating means are preferably provided for separating the hydrogen from the reaction residues. Such separating means can e.g. comprise a semi-permeable membrane.

The compartments for the fuel, the activator fluid and the reaction residues preferably are separate flexible containers arranged within one fuel container provided with a hard shell which—for safety reasons—can be operated at low pressure in order to avoid, that any fluid within the compartments escapes the container. As a further safety precaution, membranes are preferably provided to separate the flexible containers for fuel, activator fluid and spent fuel. As a still further safety measure, each of the flexible containers and the hard shell container is preferably provided with a line for supplying nitrogen as a blanketing gas and for venting any excessive pressure arising in any of the containers. This line is preferably provided with a control valve and a mechanical safety valve. In addition, the flexible containers and/or the hard shell container may be provided with sensing means for sensing and monitoring the pressure in the containers, the output of which is preferably communicated to a user interface.

In a preferred embodiment, each of the fluid lines for providing fuel and activator fluid from the fuel container and activator container to the reaction chamber is provided with a bypass and a control valve in that bypass, allowing the fuel pump to continuously re-circulate fuel through the bypass to the fuel container and the activator fluid pump to continuously re-circulate activator fluid through the bypass to the activator fluid fuel container. Upon actuation of the control valves in each bypass, fuel and activator fluid are fed to the reaction chamber.

In another preferred embodiment of the invention a hydrogen output regulation valve is arranged downstream the hydrogen outlet of the reaction chamber for regulating the hydrogen output of hydrogen from the reaction chamber.

For the operation of the device a controller may be provided which is adapted to control in particular the output pressure of the hydrogen, the operation of the fuel pump, the operation of the activator fluid pump, the actuation of the control valves in fuel and activator fluid bypass, the operation of the pump for reaction residues and/or the liquid level within the reaction chamber.

In a preferred embodiment, the reaction chamber is provided with a first heat exchanger, for removing a first portion of the heat of reaction between fuel and activator from the reaction chamber, and a second heat exchanger, for removing a second portion of the heat of reaction between fuel and activator from the mixer in the reaction chamber. By means of a suitable heat transfer fluid the heat from the first heat exchanger is provided to a heat conversion cycle, such as an Organic Rankine Cycle (ORC) or a Kalina cycle, which is connected to a steam turbine and drives a generator for generating electrical energy. Alternatively the heat form the first heat exchanger may be used in a thermo-electric device for direct conversion of heat into electrical energy, or may be shared between a heat conversion cycle and a thermoelectric device.

The heat from the second heat exchanger is used for heating purposes and/or is dissipated to the environment. The maximum temperature of the hydrogen from the reaction chamber preferably is limited to 40 degree C. in order to prevent damage to downstream equipment such as fuel cell membranes.

The device of the invention may be preferably used for combinations of dispersions containing hydrogen carrier particles as a fuel and water or alcohol as activator fluids. However, the device can also be used for solutions containing metal hydrides or metal borohydrides as fuel and an aqueous activator fluid.

The fuel of the invention consists of a solution or dispersion and an activator fluid, the preferred composition and physical properties of which have already been described above.

In the following, the invention is described in detail with reference to the drawings, wherein:

DETAILED DESCRIPTION

Figure 1:
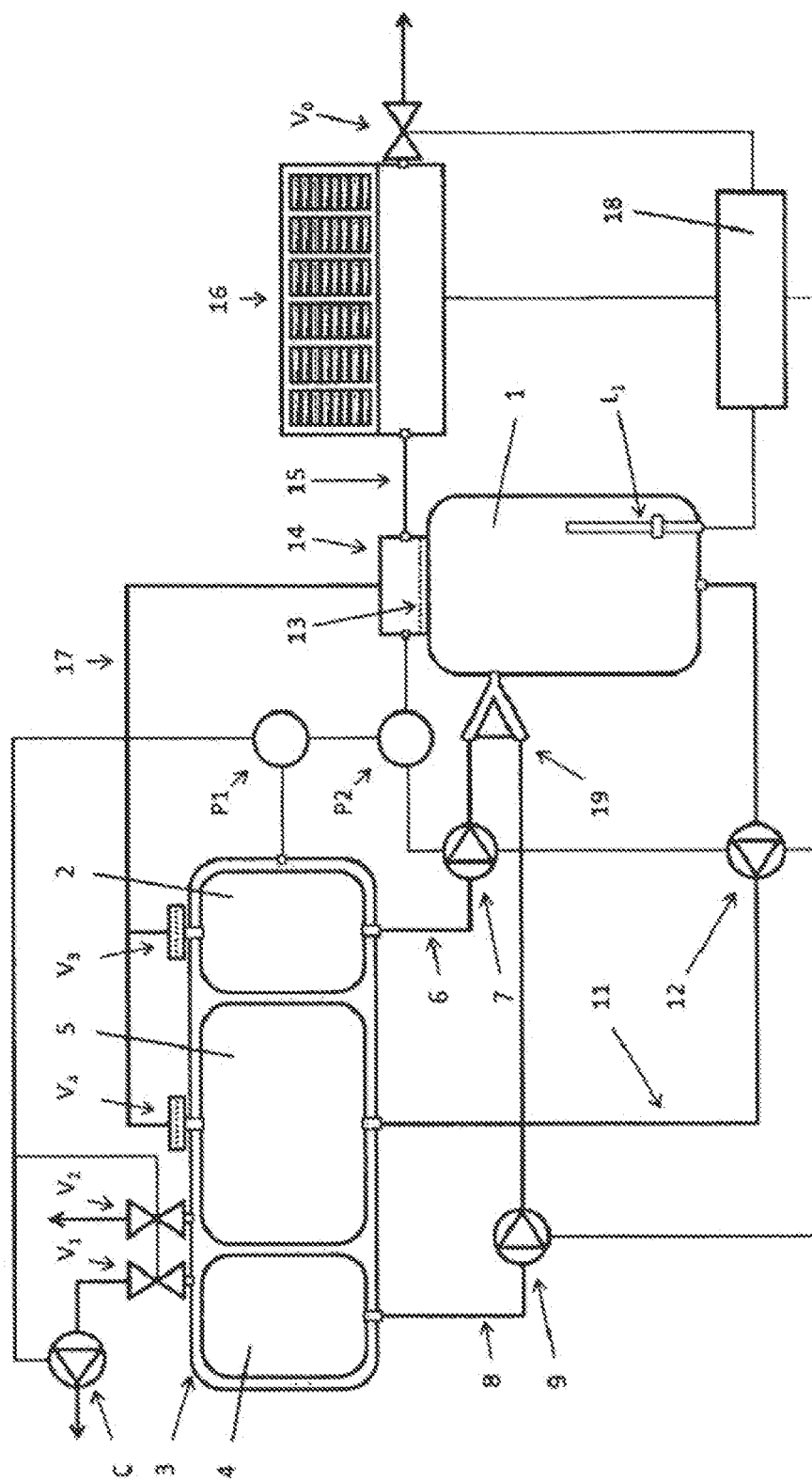
FIG. 1 is a schematic representation of a fuel system according to the invention.

A first embodiment of the fuel system according to the invention is shown in FIG. 1. The system comprises a reaction chamber 1, to which a fuel and an activator fluid can be supplied. For example, the reaction chamber 1 can be a medium pressure container allowing pressures of up to 5 bars.

The fuel to be provided to the reaction chamber is stored in a fuel compartment 2 of a fuel tank 3. The fuel tank 3 also comprises an activator fluid compartment 4 for storing the activator fluid which is to be provided to the reaction chamber 1, and a compartment for spent fuel 5 for storing the reaction products (except the generated hydrogen), which are released from the reaction chamber 1. All compartments 2, 4, 5 are arranged in a fuel tank 3, the outer part of which can be at least partly evacuated via a pressure regulating valve V1 and a compressor C. A preferred pressure within the fuel tank is 150 hPa. The fuel tank 3 can also be vented via an ambient venting valve V2.

The reaction chamber 1 can be provided with fuel from the fuel compartment 2 via line 6 and fuel pump 7, and can be provided with activator fluid from the activator fluid compartment 4 via line 8 and activator fluid pump 9. The reaction residues can be released form the reaction chamber 1 via line 11 and pump 12 to be stored in the spent fuel compartment 5. The pumps preferably are membrane pumps. For the lines and the pumps, preferably hydrogen tight membranes and seals are used.

The fuel lines used in the system, preferably comprise tubing having flashback and flame arresters and can contain sintered ceramic filters.

Both the fuel and the activator fluid are injected into the reaction chamber 1 through an inline mixer 19, which may comprise several injection nozzles (not shown). That means that the fuel and the activator fluid are injected at the same time and in a way to ensure a high shear stress between the surfaces of the fluid jets.

The reaction chamber 1 comprises at least a liquid level sensor Li to monitor the liquid level within the reaction chamber. In particular, level sensor Li can monitor and detect a lower liquid level, an upper liquid level and an alarm level at adequate levels of the reaction chamber.

At the top the reaction chamber 1 comprises an outlet for hydrogen which is separated from the rest of the reaction chamber 1 by a (hydrogen) gas permeable membrane 13. Hydrogen can be released from the reaction chamber 1 through the hydrogen outlet 14 to either a hydrogen buffer (not shown) or a hydrogen consumer (not shown) via line 15, a pressure regulator 16 and an output regulating valve Vo. The pressure regulator may comprise mechanical bellows and shall be hydrogen tight.

Moreover, filter and check valves V3 and V4, both including hydrogen gas permeable membranes, are located at the top of the fuel compartment 2 and the spent fuel compartment 5, which are connected via line 17 to the hydrogen outlet 14 for the release of hydrogen from the fuel compartment 2 and the spent fuel compartment 5.

Two sensors P1, P2 are provided for monitoring the pressure in the fuel tank and the hydrogen gas pressure at the outlet 14 of the reaction chamber 1.

The fuel system is controlled by a controller 18. The controller 18 uses the information from the pressure sensors P1, P2, the liquid level sensor Li to control either the pumps 7, 9, 12 and the valves V0, $V_1$, V.sub.2, V.sub.3. In particular, by separately controlling the pumps 7 and 9 the mixing ratio of fuel and activator fluid provided to the reaction chamber 1 can be closely controlled which enables the close control of the hydrogen generating reaction in the reaction chamber 1. A processor arrangement for controlling fuel and activator may have standard pre-selected settings for various fuels.

Figure 2:
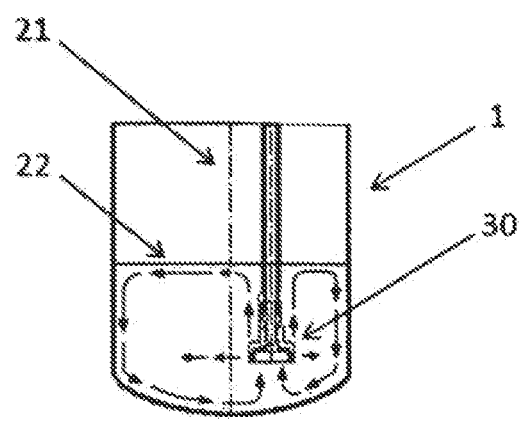
FIG. 2 shows a cross section of a first embodiment of a reaction chamber for a fuel system according to the invention.

In FIG. 2, the bottom part of the reaction chamber 1 of the system according to FIG. 1 is shown in more detail. A high shear mixer 30 is arranged at the bottom of the reaction chamber 1, slightly off-centre relative to a central axis 21 and below the liquid level, which is schematically indicated with reference number 22.

The object of the high shear mixer 30 is to allow fuel and/or partly spent fuel to re-circulate over the mixer 30 to provide an additional mixing step and in order to allow complete conversion of all fuel. This additional mixings step will also prevent the occurrence of local high and/or local low concentrations of fuel particles which could create unwanted hot and cold spots. FIG. 2 shows that the high shear mixer induce a circular flow in the reaction chamber 1 as indicated by arrow chains. This means that the fluid will flow upwards along the shaft of the high shear mixer and thereafter flow downwards along the walls of the reaction chamber 1. The fact that the fluids are mixed in this way will help to increase the shear stress of the surfaces of the fluids on each other in order to enhance mixing of the fluids and in order to increase the reaction time of hydrogen production of the system.

Figure 3:
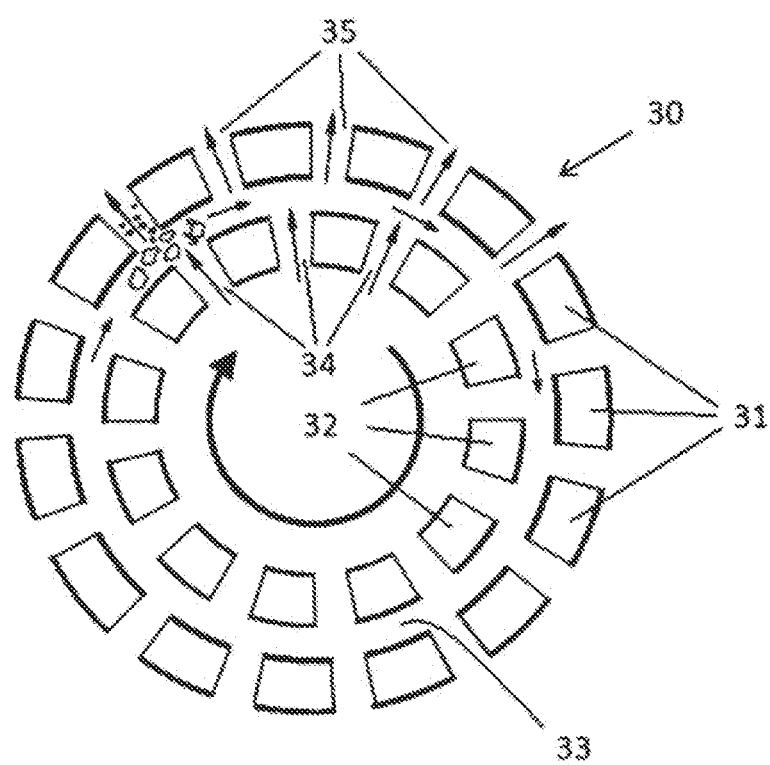
FIG. 3 shows a cross section of part of a high shear mixer, to be used in the reaction chamber according to the invention.

Part of a suitable high shear mixer 30 is shown in FIG. 3. The high shear mixer 30 comprises a circular stator 31 and concentrically thereto a rotor 32 having a smaller diameter than the stator. The rotation axis of the rotor 32 is arranged in order to allow the rotor 32 to rotate inside the stator 31 to thereby mix the fluids in the reaction area 33 between the stator and the rotor. The reaction area 33 is defined by the inner wall of the stator 31 and the facing outer wall of the rotor 32.

In order to further enhance the release of hydrogen from the fuel, additional activator fluid may be provided to the reaction area 33 through openings 34 in the wall of rotor 32. Spent fuel may be released from the reaction area 33 through openings 35 in the wall of the stator 31.

Returning to FIG. 1, the hydrogen produced in the reaction chamber 1 will be forwarded to the pressure regulator 16. In order to secure the purity of the generated hydrogen this low pressure regulator 16 may require an entry filter. For safety reasons a flame arrester should be provided to prevent flash back. The filter and flame arrester may be combined into one functional element.

Figure 4:
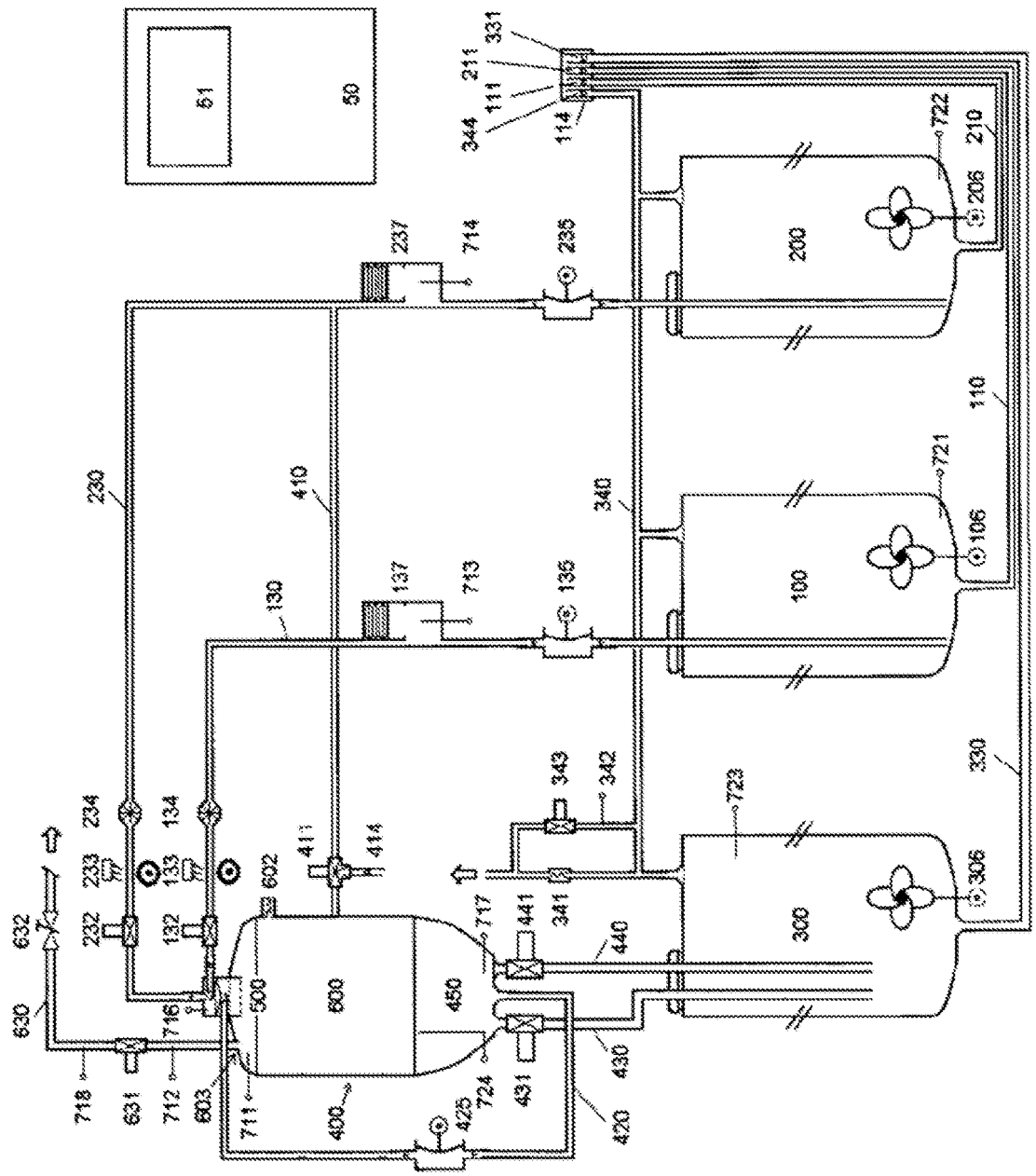
FIG. 4 is a schematic representation of a second embodiment of a fuel system according to the invention.
Figure 5:
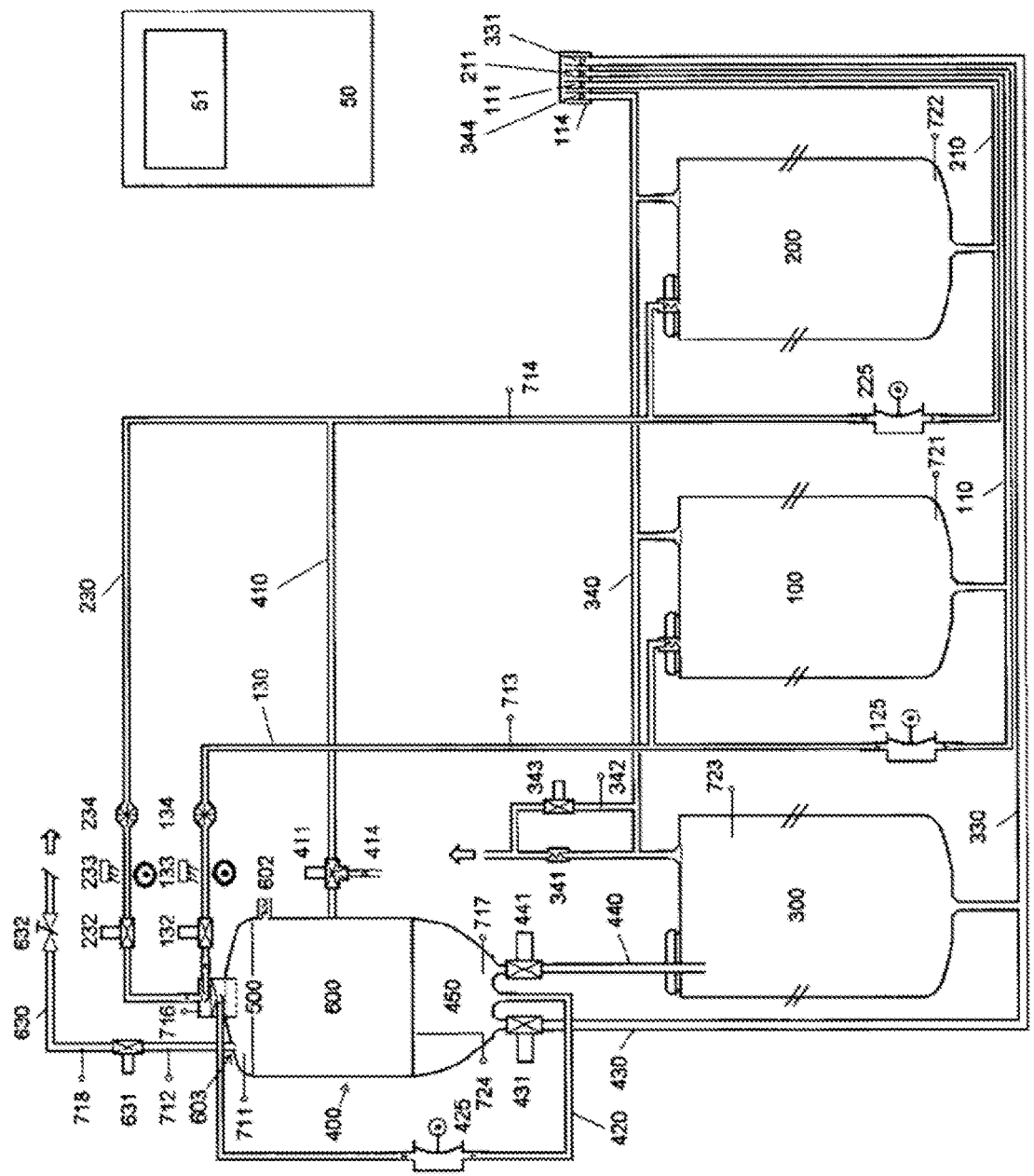
FIG. 5 is a schematic representation of a third embodiment of a fuel system according to the invention.

With reference to FIGS. 4 and 5, a second and a third embodiment of a fuel system according to the invention will be described. According to FIG. 4 the system comprises a fuel storage compartment 100, an activator storage compartment 200 and a spent fuel storage compartment 300. Each of the compartments 100, 200, 300 is provided with a sensor 721, 722, 723, respectively, for sensing the fluid level inside each of the compartments 100, 200, 300. These sensors 721, 722, 723 are preferably a Hall sensor or an optical displacement measuring system. A Hall sensor is magnetic and operates spark free.

Preferably, each of the storage compartments 100, 200, 300 has a flexible volume. This means that they are preferably arranged such that a volume increase in one of the compartments is completely are partly accompanied by a simultaneous volume decrease of the other storage compartment. The effect of this measure is an important limitation of the total amount of volume needed for the fuel tank comprising the three compartments 100, 200, 300. Before the system is used the fuel storage compartment 100 and the activator storage compartment 200 will have a certain volume to contain a fluid. At the same moment the spent fuel storage compartment 300 will be empty. During use the fuel storage 100 and activator compartment 200 will be emptied and at the same time the spent fuel compartment 300 will be filled up. When using flexible walls, which are able to follow the filling grade of the compartments 100, 200, 300, the initial space needed to accommodate the compartments 100, 200, 300 can be kept to a minimum. The systems according to FIGS. 4 and 5 can be used having flexible storage compartments 100, 200, 300 in a rigid exterior housing with a fixed volume. An embodiment of such a tank will be described with reference to FIG. 7.

As shown in FIG. 4, the storage compartments 100, 200, 300 are preferably connected to a connector 114. This connector is used to connect the storage compartments to lines for supplying fluids to and from the storage compartments 100, 200, 300 from one central location. The connector 114 is provided with a sub-connector 111 for fuel supply, a sub-connector 211 for activator supply and a sub-connector 331 in order to release spent fuel from the system. The connector is also provided with a sub-connector 344 to supply a blanket gas, such as nitrogen to the storage compartments 100, 200, 300. Preferably the sub-connectors are designed to have unique couplings that prevent the making of any undesired connection. The sub-connectors preferably are completely free of any spills. A preferred type of connector includes the quick connect series of Swagelok.

The fuel storage compartment 100 and activator storage compartment 200 are provided with a supply line 110, 210 respectively, for supplying fuel and activator (with or without a rinsing fluid) from an external source.

The spent fuel storage compartment 300 is provided with a line 330 for discharging spent fuel to an external collection system and the spent fuel discharge line 330 is provided with a valve system and a connector 331 for connecting to an external spent fuel collection system.

Each of the valve systems and connectors 111, 211, 331 may be integrated. The connectors and/or the integrated valve system and connectors may be combined in a single connector 114, which may be operated as one connector, comprising all connections. This allows for simultaneous filling of the compartments 100 and 200 and the purging of compartment 300.

As shown in FIG. 5, the storage compartments 100 and 200 may be provided with a recirculation line 120, 220 provided with a pump 125, 225 or, alternatively, with an impeller 106, 206 (see FIG. 4) for homogenisation and/or pumping purposes. A screen (not shown) may be provided in the upper section of the storage compartments 100, 200, just downstream of any recirculation line outlet for even distribution.

An impeller 106, 206, 306 (see FIG. 4) is preferred for liquids while a circulation system is preferred for dispersions. Recirculation of a dispersion allows the fuel to be evenly distributed over the total storage compartment area thus minimizing difference in concentration, while circulating liquids may result in concentration gradients. Since the activator will always be a fluid and not a dispersion, an impeller 206 is preferred for the activator fluid compartment 200.

The outlet of the recirculation line 120, 220 is provided with a maximum pressure relief valve. These valves are used to keep the maximum pressure in the fuel recirculation line typically at 8 bars and the maximum pressure in the activator line at 9 bars.

The fuel 100, the activator 200 and the spent fuel storage compartment 300 are preferably provided with a gas-fluid separation membrane at the inlet for nitrogen. The nitrogen line 340 is provided with a mechanical pressure relief valve 341 for venting any excessive pressures (>7 bar) to the environment. The nitrogen line 340 is further provided with a bypass (not shown) having a pressure transducer which may actuate a control valve. During re-fueling, nitrogen is supplied to the storage compartments 100, 200, 300 at a pressure of 3 bars. The controller 58 will control the pressure in line 340 by means of a transducer and a valve at a level between of 3.0 and 3.2 bars.

The systems according to FIGS. 4 and 5 are provided with a reactor chamber 400, a mixing chamber 500 and a buffer chamber 600 for released hydrogen. Each of the reactor chamber 400, the mixing chamber 500, and the buffer chamber 600 are in open communication to one another, allowing the unrestricted release of hydrogen.

The storage compartments for fuel 100 and activator 200 are connected to the mixing chamber 500 with a line for supplying fuel 130 and a line for supplying activator 230. Each of these lines 130, 230 is used to provide the reactor chamber 400 with fuel and activator, using a control valve 132, 232 that is positioned at the end of the line at the entrance of the mixing chamber 500. The control valves 132, 232 have an opening pressure of 8 bars for fuel and an opening pressure of 9 bars for activator. Each of the lines 130, 230 is provided with a pressure transducer 713, 714 and may be provided with a minimum and maximum pressure switch. Each of the lines 130, 230 is preferably provided with fluid control sensors 133, 233 and volume flow meters 134, 234. By locating fluid control sensors between the control valves for activator and fuel and the mixing chamber 500, the presence of fuel and activator in the lines is monitored (or checked) and no fuel can be dosed to the mixing chamber 500 without the presence of any activator. Thus the reaction of additional activator (for reducing the viscosity measured via recirculation) with a very high concentration of fuel in the reactor room is prevented and as a result the pressure in the reactor chamber is prevented from exceeding way above the alarm limits.

In the embodiment according to FIG. 4, the line 230 for supply of activator may be provided with a buffer 237 for holding a small volume of activator in order to maintain a constant liquid pressure in line 230. The line 130 for supply of fuel may be provided with a buffer 137 for holding a small volume of fuel in order to maintain a constant liquid pressure in line 130. In the embodiment according to FIG. 5 this buffer function is obtained by using the bypasses 120 and 220.

Figure 6:
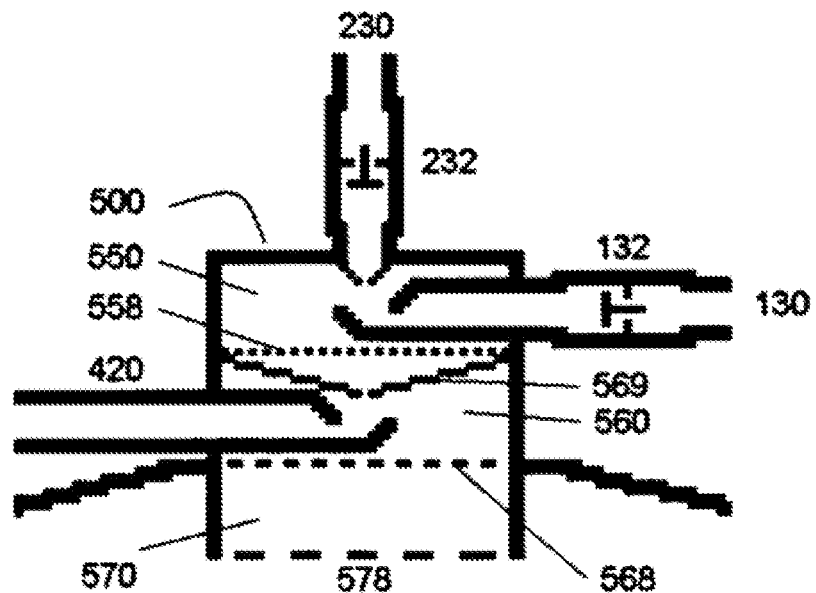
FIG. 6 shows a preferred embodiment of a set of injectors for injecting inline fuel and activator.

With reference to FIG. 6 an embodiment of the injectors for injecting fuel and activator in the mixing chamber is shown. The outlet of line 230 is preferably shaped as a nozzle 232 such that activator released from the line 230 may be injected into the mixing chamber 500 as a jet flow, while the outlet of the fuel line 130 is shaped as an open fluid passage connected to a dish-shaped element. The nozzle 232 providing the jet flow may be located in line with the open fluid passage of fuel line 130 such that the jet flow will automatically mix with any fuel released from the open fluid passage. The jet flow is arranged such that an intensive mixing between the fuel and the activator is obtained in order that most of the protecting fluids from the solid particles of a fuel granulate dispersion are removed.

The mixing of the fluids comprises a first stage 550 where the activator line nozzle 232 sprays a relatively powerful jet of activator fluid into a flow of fuel which is released by the fuel line 130 in a first dish-shaped outlet, thereby flushing the oil from the granulate and exposing the fuel to the activator. The reacting mixture flows through a first perforated separation 558 to the second stage 560 where it is guided by guide 569 to a second dish-shaped outlet of remixing line 420, where it is mixed with spent fuel which is re-circulated from the receiver area 450 to the second stage 560 of the mixing by pump 425 through bypass 420 (see FIG. 5).

The reaction mixture from the second stage may flow through a second perforated separation 568 to a third stage 570 in order to allow completion of the reaction, prior to flowing through a third perforated separation 578 into the reactor 400. Alternatively, the reaction mixture may flow from the second stage directly into the reactor 400.

Figure 5A:
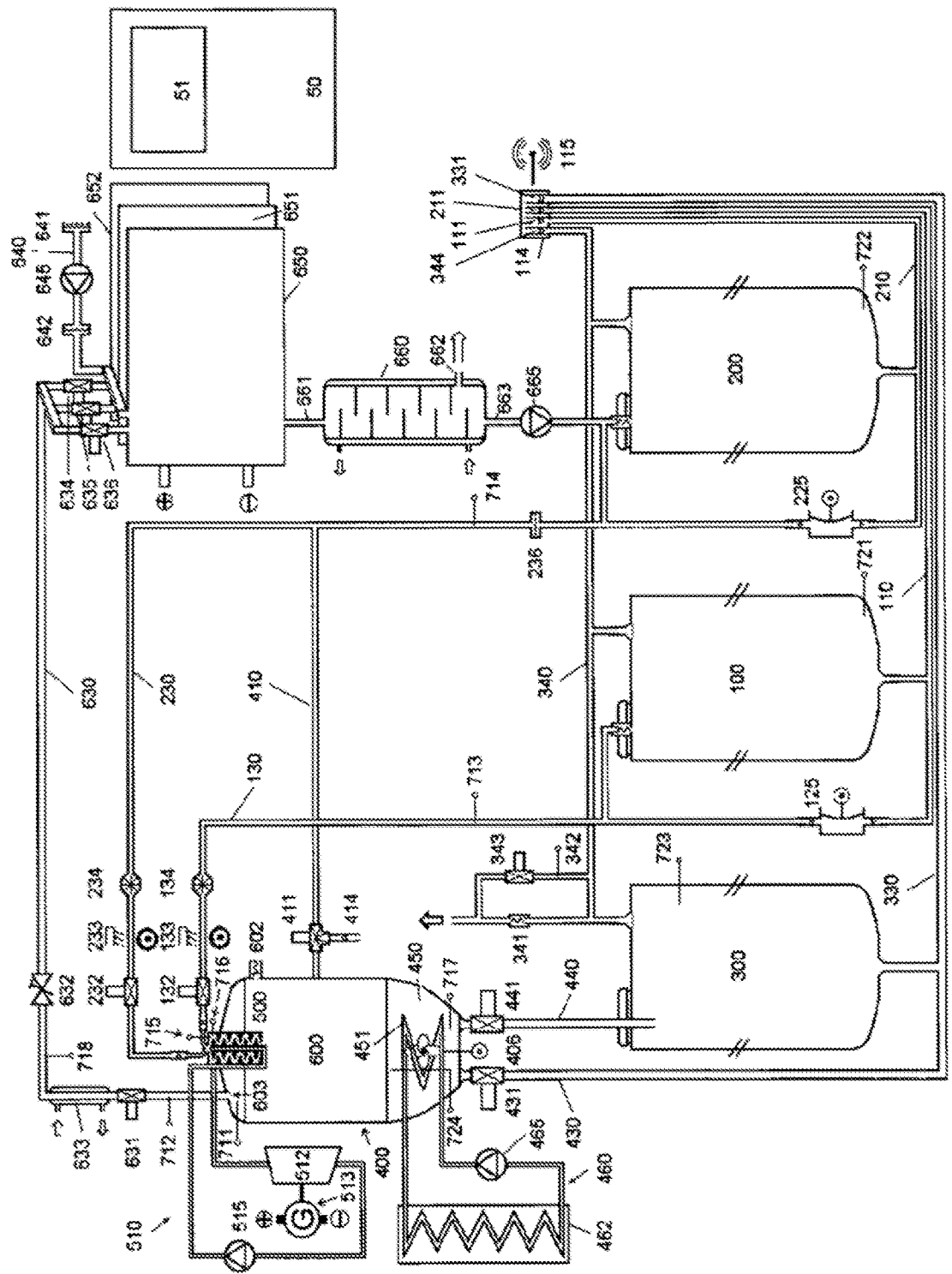
FIG. 5A is a schematic representation of the embodiment of FIG. 5, comprising cooling circuits, and a stack of fuel cells.
Figure 6A:
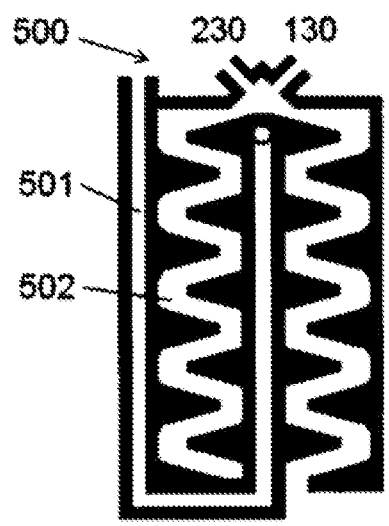
FIG. 6A shows another preferred embodiment of an injection system for injecting fuel and activator inline.

With reference to FIG. 6A, a cross section of the mixing chamber 500 from FIG. 5A is shown in more detail. FIG. 6A shows the fuel line 130, the activator line 230, a cooling jacket 501 which may completely surround the interior channel 502.

Figure 6B:
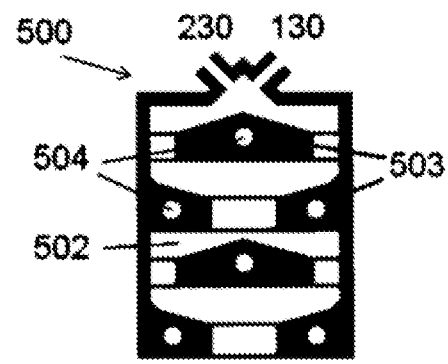
FIG. 6B shows a third preferred embodiment of an injection system for injecting fuel and activator inline.

FIG. 6B shows a cross section of another preferred embodiment of a mixing chamber 500 in more detail. The interior channel 502 has layered compartments, divided by cooling elements 503 provided with cooling channels 504 for carrying a cooling fluid.

Returning to FIGS. 4 and 5, the mixing chamber 500 preferably has multiple stages which are in open communication to one another and ultimately communicate with the reactor chamber 400 and the buffer chamber 600. By providing a multiple stage mixing chamber 500, wherein the different stages are separated by perforated plates having a decreasing flow resistance, a pressure gradient is created which causes turbulent mixing in each stage and which drives the reaction products from one stage to the next and so on. This means that the outlet for produced hydrogen (including the safety valve) cannot be placed inside the mixing chamber and will be placed in the reactor chamber 400. The number of stages will depend on the desired reaction rate.

The lower part of the reactor chamber 400 is shaped such that this lower part will receive non-gaseous reaction products from the mixing of fuel and activator. The lower part is hereinafter referred to as "receiver area" 450. The non-gaseous reaction products are spent fuel, which is collected in the receiver area 450 by gravity and the gas pressure in the reactor room. The convex shape of the receiver area 450 allows easy transport of the spent fuel from the reactor chamber 400 to the receiver area 450.

The receiver area 450 is preferably connected to the storage compartment for spent fuel 300 via a first 430 and a second line 440 for transporting spent fuel. The second line 440 is a backup for the first in case the first line would be blocked. The back up prevents that any electrical and/or mechanical flow problems may cause malfunction. Furthermore, it prevents blockage of the discharge valve and/or the line due to sedimentation, which may be sticky in case a fuel dispersion is used. Each of the lines 430, 440 is provided with a discharge valve 431, 441 respectively and each of the discharge valves 431, 441 is positioned in that essentially all of the spent fuel collected in the reactor chamber 400 may be remixed prior to being transported to the spent fuel storage compartment 300.

The discharge valve is preferably located at the bottom of the convex shaped receiver area 450 and the collected spent fuel in the reactor room is preferably re-circulated at all times in order to assure that the fuel is used in total and to enable a viscosity measurement in the collected spent fuel through a tachometer and a power sensor attached to the remixing pump.

The receiver area 450 is preferably connected to the mixing chamber 500 through a bypass 420 (see FIG. 5) for remixing spent fuel. The bypass 420 is provided with a pump 425 and a control valve 421, which is located below the low alarm level in the reactor room. The bypass 420 for remixing spent fuel connects to a second stage of the mixing chamber which is close to the first stage for mixing fuel and activator. The receiver area 450 may further be provided with a temperature sensor 717.

The remixing line 420 is preferably provided with a viscosity meter (not shown) for sensing the viscosity of the spent fuel. The pump 425 in the bypass 420 is preferably provided with a tachometer (not shown), more preferably a NIPKOV disk. The power line of the pump 425 is preferably provided with a power sensor (not shown).

The control system for the reactor chamber 400 has four fluid control levels: a minimum and maximum control level for the collected spent fuel, a low alarm level, which may be equal to the minimum level and a high alarm level which will always be higher than the maximum control level. The high alarm level actuates the backup (second) discharge valve while the maximum level actuates the first discharge valve. At minimum control level all actuated discharge valves will be closed. At low alarm level however, the spent fuel remixing pump 425 is stopped. If the fluid level goes down to the low alarm level (and at the same reaches the minimum level) the remixing pump will stop pumping and the discharge valves are closed. When the fluid level rises, the remixing pump will immediately be actuated.

Each of the discharge valves 431, 441 is located below the minimum level while the remixing outlet valve is located below the low alarm level in the receiver area 450. Discharge valves 431, 441 are preferably at the same height as the valve/outlet for the remixing line, in order to prevent blockage due to sedimentation. A separate remixing outlet and valve in the reactor room is preferred over a combination with discharge valves and lines in order to reduce critical malfunction. Other configurations may of course be used to remix (part of) the collected spent fuel.

The reactor chamber 400 may be provided with a connector 414 and control valve 411 for adding standard activator or an alternative activator to clean the system. Control valve 414 may be connected to the activator supply line 230.

The buffer chamber 600 is provided with a gas release line 630, which is provided with a control valve 631 and a pressure reduction valve 632 downstream of the control valve. Furthermore, the gas release line 630 is preferably provided with a flame arrester (not shown) downstream of the reduction valve 632 to prevent the propagation of any flame into the buffer chamber. A filter 603 is preferably provided between the buffer chamber 600 and the pressure reduction valve 632 for separating reaction products and allowing hydrogen to pass. A small volume buffer chamber will easily splash liquid to the outlet and hence to any system attached to the gas release line 630, due to the relatively small length to cross, and therefore requires a filter. In large industrial applications very large volume buffers may be used which do not require filters since the length to cross will be long. Splashes may however still occur.

The buffer chamber 600 is preferably provided with a mechanical pressure relief valve 602 for safety reasons. The temperature of the released gas is preferably measured by a temperature sensor 718.

The reactor chamber 400 is preferably integrated with and also used as the buffer chamber 600, including all provisions of the reactor chamber. If the buffer chamber 600 is the reactor chamber 400 then the pressure reduction valve and the filter are preferably located on top of the reactor chamber 400. The mixing chamber 500 may also be placed in the mid section of the reactor chamber 400. This also goes for the safety relief valve in order to maximize the distance between this valve and any spent fuel splashes. Placing a filter distant from the pressure reduction valve creates a second buffer chamber which has an open connection to the reactor room.

The integrated reactor chamber 400 is provided with a first 711 and a second 712 pressure transducer. The first pressure transducer 711 is preferably located upstream of the filter 603 and the second pressure transducer 712 is preferably located between the filter 603 and the pressure reduction valve 632. The reactor chamber may further be provided with a temperature sensor 716.

The system according to in FIGS. 4 and 5 is preferably provided with a control system 50 for controlling the mixing of fuel and activator, the flow of remixed spent fuel and the discharge of collected spent fuel, wherein the control of mixing fuel and activator is independent from the control of discharging the spent fuel.

The control system 50 is preferably connected to fluid control sensors 133, 233; pressure transducers 711, 712, 713, 714, 132, 232, 343; temperature sensors 716, 717, 718; a viscosity meter and/or a tachometer and/or a power sensor. The control system 50 is preferably provided with a user interface/display 51 and an algorithm for controlling all sensors and actuators. The controller 50 may be provided with a wireless communication system for communicating the filling status, fuel quality, pressure safety, etc.

The system preferably is arranged such that the electric resistance in the conducting metal parts is less than 0.1 ohm and that the potential difference between any conducting metal is less than 10 mV.

The heat generated in the mixing chamber 500 by mixing fuel and activator is preferably removed by a first cooling system (not shown), using water as a cooling medium, such that in the mixing chamber an operating temperature range of 130-200.degree. C. is maintained. A second cooling system not shown may be provided, using water as a cooling medium, to maintain the receiver area 450 and the gas outlet 630 at a maximum temperature of 40° C. By controlling the temperature of the gas outlet 630, the humidity of the released hydrogen is controlled.

In practice the system according to FIGS. 4, 5 and 6 would be used as follows: the fuel storage tank 100 may be pressurized with nitrogen to prevent moisture from penetrating during refueling. As a safety precaution an overpressure vent valve may be provided which may be integrated with the fuel inlet valve 111.

The spent fuel tank 300 may contain a slight hydrogen pressure from post reaction of the binary fuel system which has not yet fully reacted. A pressure transducer 342 is provided to sense the pressure in the spent fuel tank 300 and if the pressure exceeds a predetermined value, the controller 50 actuates control valve 343 to release the excessive pressure to the environment. Any such actuation is displayed on the interactive interface/display 51.

The fuel and activator are pumped through lines 130, 230. Pressure transducers 132, 232 sense the pressures in the lines in order to monitor and guarantee the working pressure of the nozzles through controller 50.

In order to measure the amounts of fuel and activator, mass flow meters 134, 234 are respectively provided in the fuel 130 and activator 230 lines. Based on the measured flows of fuel and activator, the controller 50 determines the actual fuel-to-activator ratio and compares that value with the initial set value. Optical sensors 133, 233 senses the presence of fluids at the valve systems 132, 232 respectively and the signals from these sensors enable the controller 50 to prevent the uncontrolled release of hydrogen gas due to an unbalance in the fuel-to-activator ratio as a result of the unintended release of just fuel or just activator.

The activator line 230 is preferably provided with a filter in order to ensure that the quality of the water in the activator meets a conductance value<0.5 μS, such that the reaction between fuel and activator may be completed.

The outlets of fuel line 130 and activator line 230 preferably contain check valves to prevent leakage of fuel and activator. In this way a constant opening pressure is realized. The fuel-to-activator ratio is calculated from measured fuel and activator volumes and the required opening times of the valves for the fuel and activator are determined. For safety reasons the activator check valve is always opened prior to opening the fuel check valve and is always closed after closing the fuel check valve.

In order to make sure that the spent fuel is completely exhausted, it is re-circulated to the mixer through line 420 by actuating pump 425. This intermediate process is controlled between minimum and maximum liquid level by level switches 724, 725. In operation a constant pumping rate of the re-circulation pump is maintained by the controller 50 using the input from a tachometer. By also determining the power absorbed by the pump at that rate, a measure for the viscosity of the spent fuel is determined. By using a "lean" fuel-to-activator ratio, additional activator is required for the complete release of all hydrogen stored in the hydride fuel. The amount of additional activator can be controlled by the controller 50 based on the viscosity of the spent fuel.

By mixing fuel and activator hydrogen gas is released instantaneously. Starting and stopping the simultaneous flow of fuel and activator implies starting and stopping the release of hydrogen gas. This allows the process to be controlled. The amount of hydrogen gas released depends on the amount of fuel injected, since completion of the process requires an excess of activator to be present in the reactor. The spent fuel control is similarly adjusted. By actuating valves 132 and 232 in the fuel 130 and activator 230 lines, a pressure increase of pump 235 in the activator line 230 suffices to increase the amount of activator and thereby adjust the fuel-to-activator ratio and adjust the viscosity.

The chemical reaction between fuel and activator is independent of the pressure generated in the reaction chamber 400. Up to a pressure of 50 bars this does not affect the intended control range. The hydrogen pressure in the reactor is also used to displace spent fuel from the reactor 400 to the spent fuel storage tank 300 through discharge lines 430 and/or 440. Such displacement is controlled by actuating discharge valves 431 and/or 441.

The outlet of the reactor 400 is provided with a gas/fluid filter 603 to prevent fluids to be released from the reactor. Since this filter may be blocked, a first pressure transducer 711 is provided in the reactor and a second pressure transducer 712 is provided in the hydrogen gas line 630. By comparing the recorded pressure curves of first 711 and second 712 transducer, the algorithm of the controller 50 may signal any pressure differences indicating e.g. blockage of filter 603. Another safety precaution includes a specific algorithm of the controller, which continuously relates pressure increases to fuel dosage and signals any unexpected pressure increases.

With reference to FIG. 5A, a mixing chamber 500 is provided in buffer chamber 600, comprising a pressure transducer 715 for sensing the pressure in the mixing chamber and a temperature sensor 716 for sensing the temperature in the mixing chamber.

A first cooling circuit 510 is connected to the mixing chamber 500, to remove a first part of the heat of reaction between fuel and activator for heat recovery purposes. The first cooling circuit 510 comprises a first heat exchanger 512, driving a generator 513 for converting heat into electrical power. The circuit 510 further comprises a pump 515 for pumping cooling fluid having a relatively low temperature to the mixing chamber 500.

A second cooling circuit 460 is connected to a cooling spiral 451 which is provided in the receiver area 450, to remove a second part of the heat of reaction between fuel and activator. The second cooling circuit 460 comprises a second heat exchanger 462, which may be used for heating purposes or for dissipating the heat removed from the receiver area to the environment. The circuit 460 further comprises a pump 465 for pumping cooling fluid having a relatively low temperature to the cooling spiral 451. The receiver area 450 is also provided with a mixer 406, in order to mix and homogenize the mixture of fuel and activator.

The gas release line 630 is provided with a third heat exchanger 633, in order to control the temperature of the hydrogen and thus the moisture content of that hydrogen which is released from the buffer chamber 600. The third heat exchanger 630 may be connected to a separate cooling circuit not shown e.g. an air conditioning circuit of a vehicle.

The gas release line 630 is connected to a fuel cell stack 650, 651, 652 through control valves 634, 635, 636, allowing each of the fuel cells 650, 651, 652 to be operated in their optimum performance window separately and independently. The fuel cell stack is further provided with an ambient air supply line 640 comprising a first filter 641 for removing any dust from the air taken in by the supply line, a pump 645 for pumping air, a second filter 642 for actively removing any contamination which has passed the first filter 641 and which may deteriorate the performance of the fuel cells 650, 651, 652 such as sulfides. The outlet of the fuel cell stack is connected to a fourth heat exchanger 660 for condensing water from the exhaust of the fuel cells 650, 651, 652, having an inlet 661 for receiving the fuel cell exhaust, a first outlet 662 for releasing relatively cool and relatively dry air, and a second outlet 663 for releasing condensed water which is pumped to the activator line 230 by pump 665. In order to prevent any contamination in the condensed water to enter the mixer, the activator line 230 is provided with a filter 236.

The connector 114 is provided with a wireless connection 115 to the refueling dispenser (not shown) and/or to the controller 50.

For every kg of hydrogen generated, the system according to the invention produces some 44 MJ of heat. The majority of this heat is produced in the mixer, resulting in local temperatures exceeding 200° C., while a smaller portion will end up in the spent fuel and hydrogen, with temperatures in the range 40-60° C.

Therefore, the reaction chamber is preferably provided with a first heat exchanger, for removing a first portion of the heat of reaction between fuel and activator from the reaction chamber 1, and a second heat exchanger, for removing a second portion of the heat of reaction between fuel and activator from the mixer 30 in the reaction chamber. By means of a suitable heat transfer fluid, having an inlet temperature of e.g. 80° C. and an outlet temperature of e.g. 200° C., the heat from the first heat exchanger is provided to a heat conversion cycle, such as an Organic Rankine Cycle (ORC) or a Kalina cycle, which is connected to a steam turbine and drives a generator for generating electrical energy. Alternatively the heat form the first heat exchanger may be used in a thermo-electric device for direct conversion of heat into electrical energy, or may be shared between a heat conversion cycle and a thermo-electric device. Obviously the highest heat transfer will be achieved by providing a counter-current flow of heat transfer fluid relative to the flow of fuel.

The maximum temperature of the hydrogen from the reaction chamber preferably is limited to 40° C. in order to prevent damage to downstream equipment such as fuel cell membranes. By means of a suitable heat transfer fluid, such as water having an inlet temperature of e.g. 20° C. and an outlet temperature of e.g. 40° C., hydrogen is cooled and subsequently the spent fuel is cooled to an outlet temperature of e.g. 60° C. The heat from the second heat exchanger is used for heating purposes and/or is dissipated to the environment.

A Rankine cycle is a thermodynamic process for converting (residual) heat to work. In practice, a medium such as water is turned into overheated steam by heating to a temperature well beyond the boiling point. The overheated steam is fed to a steam turbine driving a generator, where it expands. The expanded steam is subsequently condensed and pumped to the evaporator where the cycle is repeated. The steam is overheated in order to prevent condensation in the steam turbine.

When operating the system according to FIGS. 4, 5 and 6 the following parameters could be used:

| | |
|---|---|
| fuel-to-activator volumetric ratio (default) | 100/90 |
| fuel line bypass opening pressure | 8.0 bars |
| activator line bypass opening pressure | 9.0 bars |
| reactor chamber lower pressure control level | 4.5 bars |
| reactor chamber upper pressure control level | 5.0 bars |
| reactor chamber lower pressure alarm level | 4.0 bars |
| reactor chamber upper pressure alarm level | 6 bars |
| reactor chamber mechanical relief valve action level | 8 bars |
| reactor chamber upper disabling pressure for activator | >5 bars |
| reactor chamber upper disabling pressure for fuel | >5 bars |
| reduction valve pressure | 0.5 bar |
| fuel and spent fuel storage compartment upper pressure alarm level | 4.5 bars |
| fuel and spent fuel storage compartment mechanical relief valve action level | 7 bars |
| reactor chamber upper temperature level | 80 degree C. |
| nitrogen fill pressure storage compartments | 3 bars |
| control band nitrogen fill pressure storage compartments | 3.0-3.2 bars |

When operating the system according to FIGS. 4-6 the following steps should be followed when the system is started up:

1. On power up, all sensors are checked by the control system 50.
2. The level sensors 721, 722, and 723 indicate the amount of fuel, activator and spent fuel in the storage compartments 100, 200, and 300.
3. The pressure transducer 342 measures the actual pressure in the storage compartments 100-300.
4. The pressure transducers 132, 232 sense the actual pressure in the lines for fuel and activator 130, 230.
5. The pressure transducers 711, 712 sense the actual pressure in the reactor chamber. The upstream and downstream pressures according to pressure transducers 711, 712 are compared (check) and the best value is selected.
6. If the pressures according to pressure transducers 711, 712 differ more than e.g. 10% this is signalled to a user interface/display 51 as an early warning of blockage of filter 603.
7. If this apparent pressure difference persists or increases, the filter 603 must be replaced.
8. The level sensors 724-725 indicates the amount of spent fuel collected in the reactor chamber 400.
9. The optical sensors 133, 233 sense the presence of fluid in the fuel 130 and activator 230 lines.
10. If a level sensor senses no fluid (fuel or activator) the particular control valve and pump are actuated until the level sensor senses fluid or until a standard time has passed. If the level sensor still senses no fluid the system does not start and indicates (an) empty line(s).
11. The temperature sensor 714 senses the temperature of the activator line.

The temperature sensor 716 senses the temperature of the reactor.

13. If steps 1-12 are within the control band the system starts.
14. The fuel pump 135 and activator pump 235 (and spent fuel impeller 306 or remixing pump 325) is started, starting the automatic recirculation of fuel and activator, based on the opening pressure of the valves in the fuel and activator bypass.
15. Based on the fuel-to-activator ratio the activator valve opening time is set.
16. A demand for hydrogen will cause the pressure in the reactor chamber to drop below the upper pressure control level, as sensed by pressure transducers 711, 712 whereupon the control valves 132, 232 in the fuel and activator lines are actuated.
17. The fuel control valve 132 can only be actuated if the activator control valve 232 is actuated and the activator control valve can only be closed if the fuel control valve is closed.
18. Fuel and activator start to flow as sensed by the fuel line volume flow meters for fuel and activator.
19. The ratio between fuel and activator is controlled by the opening times of valves 132 and 232 based on the volumes measured by flow meters.
20. The fuel line pressure is limited to 8.0 bars and the activator line pressure is limited to 9.0 bars by the valves in the respective bypasses.
21. The (adjusted) fuel valve opening time creates an offset between the calculated fuel to activator ratio and the default ratio. The activator valve opening time is readjusted to compensate this offset.
22. Due to the release of hydrogen the pressure in the reactor chamber increases.
23. During start-up no action is taken when the pressure in the reactor chamber increases to a higher value than the lower pressure alarm level (e.g. 4 bars).
24. Upon reaching the reactor chamber lower pressure control level (e.g. 4.5 bars), the gas release valve 631 is actuated allowing the pressure reduction valve 632 to supply hydrogen at e.g. 3 bars to e.g. an engine or fuel cell.

Once the system is fully operational, the following steps will be followed:
25. The activator and fuel valve opening times are controlled in a master-slave fashion according to steps 16 through 21.
26. As a check on the control mechanism, the values from the volume flow sensors for fuel and activator may be integrated over time, and adjusted to a fuel to activator volume ratio of 100/110.
27. During operation the spent fuel is collected in the receiver area 450.
28. Upon exceeding the lower liquid alarm level in the receiver area 450 the control valve in the bypass 420 is actuated and the spent fuel remixing pump 425 is actuated.
29. The power consumption of the reactor impeller (or recirculation pump 425) is measured (as well as the pump rate (Nipkov disk)).
30. The actual viscosity of the spent fuel is determined based on the values in steps 27-28.
31. The actual viscosity determined in step 29 is compared to the set value.
32. If the actual viscosity is higher than the set value, additional activator (on top of the default volumetric ratio) is pumped to the mixing chamber up to a fuel to activator volumetric ratio of 100/110, or until the actual viscosity equals the set value.
33. Upon reaching the upper liquid control level in the receiver area 450, the discharge valve 431 is actuated, allowing the pressure in the reactor room to drive the spent fuel through line 430 from the receiver area 450 to the spent fuel storage compartment 300.
34. After the spent fuel in the receiver area has reached the lower liquid control level, the discharge valve (431) is closed.

For operational safety the following steps should be followed:
35. The fuel storage compartment 100 is preferably flushed with nitrogen via a sub-connector of connector 114, prior to charging fuel and after charging the supply line 110 is preferably flushed with nitrogen such that contact between fuel and ambient air is excluded and a nitrogen blanket is kept over the fuel to prevent the formation of explosive hydrogen/air mixtures.
36. All sensors and actuators are preferably explosion proof.
37. By pumping fuel and activator from the storage compartments 100 and 200 and discharging spent fuel to storage compartment 300, the total volume will vary and thus the pressure of the nitrogen blanket over the liquid. The valve 343 actuated by pressure sensor 342 will keep the pressure below 3.2 bar. Upon reaching the upper pressure alarm level in the spent fuel storage compartment, this is signaled to the user interface/display 51 as an early warning that the spent fuel contains un-reacted fuel and the control valve 132 is actuated until a standard volume of activator is pumped into the reaction chamber.
38. If despite step 37 the pressure in the spent fuel storage compartment further increases to the action pressure level (e.g. 7 bars), the pressure relief valve opens, allowing hydrogen to be released from the system.
39. Upon reaching the upper pressure alarm level in the reactor chamber (e.g. 6 bars), hydrogen release must stop immediately, therefore the control valves 132, 232 in the fuel and activator lines are closed and consequently the fuel 135 and activator pumps 235 are stopped.
40. If despite step 39 the pressure in the reactor chamber further increases to the action pressure level (e.g. 8 bar), the pressure relief valve 602 opens, allowing hydrogen to be released from the system and preventing dangerous pressures.
41. Any pressure alarm is signaled on a user interface/display 51 and implies that the fuel-to-activator ratio needs adjustment.
42. After the pressure in the reactor chamber has dropped below the upper disabling pressure for activator, the activator pump 235 is restarted and the control valve 231 is actuated until a standard volume of activator is pumped into the reaction chamber.
43. After the pressure in the reactor chamber has dropped below the upper disabling pressure for fuel, the fuel pump 135 is restarted.
44. After the pressure in the reactor chamber has dropped below the upper control level, the system resumes normal operation according to step 25.
45. The values from the liquid level sensors 721, 722, 723 (fuel, activator and spent fuel storage compartment levels) are continuously compared.
46. If (100 minus the spent fuel storage compartment level) deviates more than e.g. 10% from the fuel or activator storage compartment level, this is signaled to the user interface/display 51 as an early warning of sedimentation near the discharge valve 431, restricting the flow of spent fuel through line 430.
47. The discharge valve 431 may in that case be flushed by actuating control valve 411, allowing activator to flow from storage compartment 200 through line 410 into the reactor chamber 400.
48. Upon reaching the upper liquid alarm level in the receiver area 450, the second discharge valve 441 is actuated, allowing the pressure in the reactor room to drive the spent fuel through line 440 from the receiver area 450 to the spent fuel storage compartment 300.
49. Step 47 may in that case be repeated.
50. After the spent fuel in the receiver area has reached the lower liquid control level, the discharge valves 431, 441 are closed.
51. Any liquid alarm is signaled on the user interface/display 51 and implies that spent fuel sediment blocks the discharge valve 431.
52. Upon reaching the upper temperature level in the reactor chamber 400, the cooling means are actuated until the temperature is below that level.

The system may be stopped any time, in which case the system pressure automatically settles at the maximum values of the control band.

For charging and discharging the following steps can be followed:
53. Low fuel and/or activator levels are signaled on the user interface/display (51).
54. At a refueling station, the integrated connector 114 is connected to the connector of the external supply source for fuel, activator and nitrogen, as well as the external spent fuel collection all at the same time.
55. Preferably a data communication link such as a telemetry link is automatically established for exchanging data regarding system pressure, liquid levels, fuel grade etc. The data communication link may have a manual override.
56. Simultaneously fuel and activator are supplied to the storage compartment for fuel 100 and activator 200 while spent fuel is discharged from the spent fuel storage compartment 300.
57. A nitrogen blanket is maintained in all storage compartments by an external supply of nitrogen at a pressure of 3 bars.
58. The values from the liquid level sensors 721, 722, 723 (fuel, activator and spent fuel storage compartment levels) are continuously compared.
59. If (100 minus the spent fuel storage compartment level) deviates more than e.g. 10% from the fuel or activator storage compartment level, this is signaled to a user interface/display as an early warning of sedimentation in the spent fuel storage compartment, restricting the flow of spent fuel through the valve 331.
60. The discharge valve 331 and/or the spent fuel storage compartment 300 may in that case be flushed by pumping water through the integrated connector 114 into the spent fuel storage compartment.
61. Upon reaching the maximum level for fuel and activator, the supply of fuel 100 and activator to the storage compartments 200 is stopped.
62. Upon reaching the minimum level for spent fuel, the discharge of spent fuel to the external spent fuel collection is stopped.
63. The integrated connector 114 is disconnected from the connector of the external supply source for fuel, activator and nitrogen, as well as the external spent fuel collection. For storage safety the following steps should be taken into account:
64. Upon reaching the upper pressure alarm level in the spent fuel storage compartment 300 (e.g. 4.5 bar), hydrogen may be released by actuating an additional control valve at the top of the spent fuel storage compartment.
65. If despite step 64 the pressure in the spent fuel storage compartment further increases to the action pressure level (e.g. 7 bar), the pressure relief valve 341 opens, and allowing hydrogen to be released from the spent fuel storage compartment and preventing dangerous pressures.
66. Any pressure alarm is signaled to the user interface/display 51.
67. Each of the nitrogen inlets of the storage compartments 100, 200 and 300 is provided with an additional membrane filter in order to strictly separate the liquids.

All the mentioned steps are preferably provided with control tables listing the control parameters, control settings and action levels of the various sensors and actuators. This way control loops may provide "Yes" or "No" values when comparing a sensed control parameter to a control setting or action level.

An automotive design may comprise flexible tanks held in a rigid container wherein the space initially occupied by the fuel and activator due to consumption is gradually replaced by the spent fuel. The volume of the spent fuel is always less than the volume of the corresponding fuel and activator.

Figure 7:
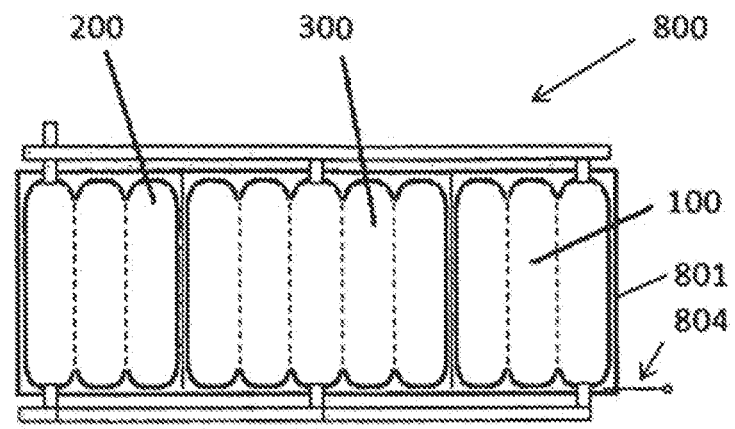
FIG. 7 shows an embodiment of a fuel tank, with flexible compartments for containing fuel, activator fluid and spent fuel.

In FIG. 7 a possible embodiment of such a tank 800 for automotive purposes is shown. The tank 800 comprises an outer shell 801, which provides rigidity and protection for the element inside the tank 800.

The tank comprises a flexible fuel compartment 100, a flexible activator compartment 200 and a flexible spent fuel compartment 300. For safety purposes a sensor 804 is added in order to measure possible presence of moisture inside the tank 800. The tank can also be provided with heating means in order to be able to use the tank 800 at low temperatures.

The use of flexible compartments 100, 200 and 300 allows for minimizing the total amount of volume needed for the tank 800. Before the system is used the fuel storage compartment 100 and the activator storage compartment 200 will have a certain volume to contain a fluid. At the same moment the spent fuel storage compartment 300 will be empty. During use the fuel storage 100 and activator compartment 200 will be emptied and at the same time the spent fuel compartment 300 will be filled up. When using flexible walls, which are able to follow the filling grade of the compartments 100, 200, 300, the initial space needed to accommodate the compartments 100, 200, 300 can be kept to a minimum.

The tank 800 can be used in combination with a fuel cell which uses the hydrogen produces with the system according to the invention.

It is a possibility to recover water that has been used in the fuel cell in order to re-use the water as activator.

Hydrogen reacts with oxygen from the air in a fuel cell to form water, electricity and some heat.

$$1H_2 + \tfrac{1}{2}O_2 \rightarrow 1H_2O \tag{1}$$

Until the present date, the recovery of the water formed has received very little attention since the water is mainly used for humidifying the fuel cell membranes in order to retain their electrical conductivity. When using fuel to produce hydrogen on demand, water is used as an activator. By reducing the total quantity of fuel on board a vehicle, and more in particular by reducing the amount of water, the volumetric and gravimetric energy density of the fuel system is improved.

It appears that whether you depart or arrive with a certain mass or volume, it has to be trans-ported anyway, but the demands are based on a full tank at departure.

Each mole of hydrogen formed from fuel requires 1 mole of water.

$$1Al(BH_4)_3 + 12H_2O \rightarrow 12H_2 + Al(OH)_3 + 3B(OH)_3 \tag{2}$$

Thus the water formed in a fuel cell according to equation (1) may be reused for generating hydrogen according to equation (2). Ambient air contains 20.95% of oxygen, which at ambient conditions (20.degree. C., 1 bar) through $$p \times V = n \times R \times T \quad (3)$$

corresponds with 8.6 moles (100000×20.95%/8.314×293).

Under the same conditions 1 m3 of air corresponds with 41.05 moles (8.6/20.95%). Conversion of one kg of hydrogen (1000/2.016=496 moles) with ambient air 1 at an equal air-to-fuel ratio then requires 28.8 m3 of air (496×8.6), of which 20.95% is consumed.

Assuming the fuel cell outlet to be 40.degree. C. at 1 bar, this results in a release of 24.4 m.sup.3 of air ((1-20.95%)× 28.8×313/293) containing 8.9 kg of water (496×18.015/1000) or 367 g/m$^3$. At 60° C., the volume of released air will be 25.9 m$^3$ (24.4×333/313) containing 345 g/m3 of water and at 80° C.: 27.5 m$^3$ (24.4×353/313) containing 325 g/m$^3$ of water.

It is clear that at an equal air-to-fuel ratio, a fuel cell, even when operated at 80° C., produces an amount of water that exceeds the air saturation level. For complete conversion of all hydrogen, the air-to-fuel ratio normally is kept between 1.1 and 1.5. By further increasing the air-to-fuel ratio, the water content may be reduced to the saturation level.

At 40° C., this ratio must be increased by a factor of 7.3 (367/51), at 60° C. it must be increased by a factor of 2.7 (345/128), and at 80° C. it must be increased by a factor of 1.1 (325/287). These values correspond very well with the air-to-fuel ratios required for cooling the heat production of the fuel cell, which assuming a fuel cell efficiency of 80%, will amount to 24 MJ (120×20%).

Figure 8:
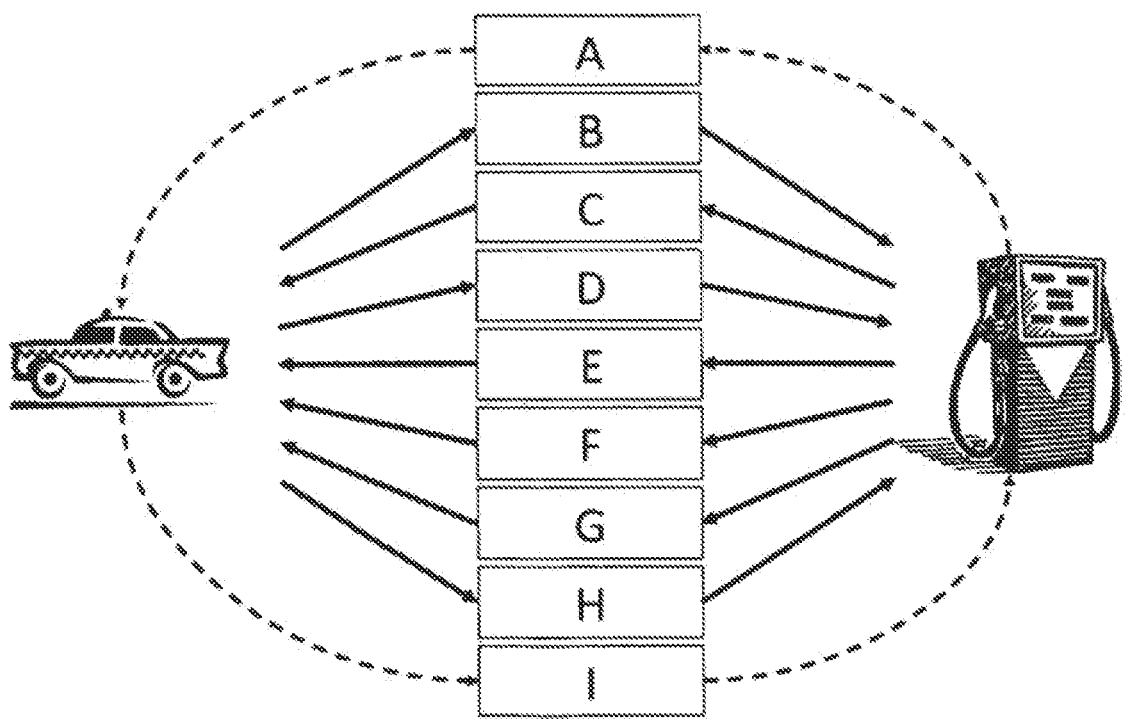
FIG. 8 is a schematic representation of the delivery of the fuel to a vehicle.
Figure 9:
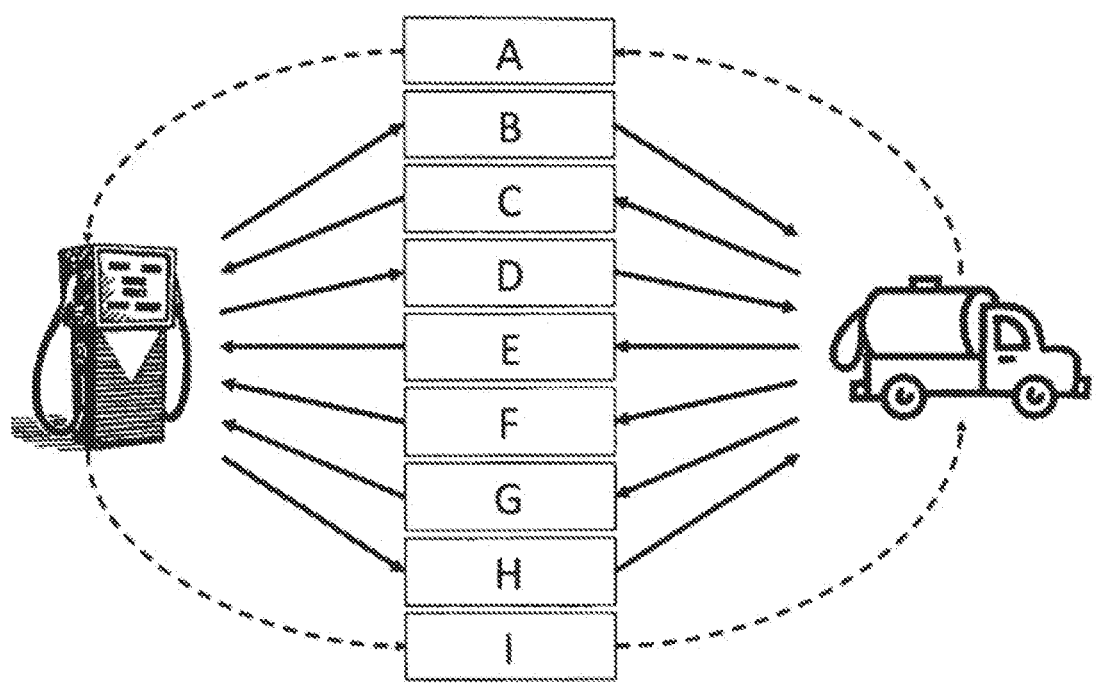
FIG. 9 is a schematic representation of the delivery of the fuel at a service station.

FIGS. 8 and 9 show schemes for service station delivery of fuel and for service station supply of fuel to a system according to the invention.

The service station delivery of fuel to an automotive vehicle may comprise the steps of connecting a connector line to the fuel tank of the automotive vehicle, the connector line providing a joint connection for fuel, water and spent fuel between a fuel tank, a water tank and a spent fuel tank of a service station dispenser to the fuel compartment, the water compartment and the spent fuel compartment of the vehicle's fuel tank and making a wireless electronic connection between a control unit of the vehicle and the service station dispenser, then removing spent fuel from the spent fuel compartment of the fuel tank, followed by an automatic rinsing of the respective spent fuel part of the connector line with water, next filling of the fuel and activator fluid compartments of the fuel tank with fuel and (e.g.) water via the water and the fuel part of the connector line, rinsing the respective water and fuel part of the dispenser line with water and mineral oil, and finally disconnecting the connector line, rinsing the fuel tank connector with water and disconnecting the wireless electronic connection between the control unit of the vehicle and the service station dispenser. Through the wireless connection data may be exchanged between the dispenser and the control unit regarding e.g. tank level, fuel-to-activator ratio etc.

In the same sequence of steps, the fuel, water and spent fuel may be exchanged between a road tanker and the service station. However, it is also feasible, that a service station prepares its own activator fluid, i.e. has own possibilities of purifying water to the needed purity by any measures as described above. In this case, it is not necessary for the service station to be provided with water by a road tanker.

The steps previously described are preferably executed using a dispenser provided with separate lines enclosed by a single tubular cover and connected to a unique connector for simultaneously dispensing fuel, activator fluid and nitrogen gas for blanketing, and collecting spent fuel. The connector of the dispenser including each of the sub-connectors can be connected to the connector of a vehicle in one possible way and fuel, activator fluid and nitrogen gas can be dispensed and spent fuel can be collected provided a proper gastight connection is made between the connector of the dispenser and the connector of a vehicle.

Ultrapure water is preferably produced on site at the service station using suitable filters and/or electro-deionization equipment. The quality of the ultrapure water is preferably controlled using sensors for sensing conductivity. Maximum conductivity is 0.5 microSiemens.

In FIG. 8 the supply of fuel to a car is schematically indicated. In FIG. 9 the supply of fuel from a road tanker to a service station is schematically indicated.

In the FIGS. 8 and 9 the several blocks A-I represent:
A. connecting a combined connector line comprising individual channels for simultaneously providing fuel, activator fluid and a shielding gas to the fuel tank of the automotive vehicle, and collecting spent fuel from the fuel tank of the vehicle, the combined connector line providing a joint connection between a fuel tank, an activator tank, a spent fuel tank and a gas supply of a service station dispenser to the fuel compartment, the activator compartment and the spent fuel compartment of the vehicle's fuel tank and making a wireless electronic connection between the control unit of the vehicle and the dispenser,
B. removing spent fuel from the spent fuel compartment of the fuel tank through the spent fuel channel of the connector line,
C. rinsing the spent fuel channel of the connector line with water,
D. filling the fuel compartment of the fuel tank with fuel via the fuel channel of the connector line,
E. filling the activator compartment of the activator tank with activator fluid via the activator channel of the connector line,
F. maintaining a minimum gas pressure of the shielding gas while venting a backflow of the shielding gas to the environment,
G. rinsing the fuel channel of the connector line with mineral oil,
H. rinsing the activator channel of the connector line with water, and finally
I. disconnecting the combined connector line, rinsing the fuel tank connector with water and disconnecting the wireless electronic connection between the control unit of the vehicle and the dispenser.

In the system according to the invention hydrogen-containing fuel is used. After manufacture, this fuel is stored under a nitrogen blanket in a closed container. When using for instance, aluminum borohydride, it is to be noted that since aluminum borohydride is miscible in all proportions with mineral oil, the fuel does not separate upon storage. The activator is miscible in all proportions with water and does not separate upon storage either. Provided the fuel is stored as indicated, the system is stable for prolonged periods of time and the risks of unintended release of hydrogen due to moisture or high temperatures are negligible. Storage in this way is also applicable during development and does not affect the intentional release of hydrogen during use.

The fuel may be transported in compartmented tankers by rail, road or vessel. Recycled glycol may be simultaneously transported in a separate compartment for mixing with purified water on site. After unloading fuel and glycol at a refueling station, spent fuel may be loaded either in a separate compartment or in the fuel compartment after flushing.

The composition of the fuel allows temperatures up to 65° C. Higher temperatures up to 80° C. may be accommodated by increasing the pressure of the nitrogen blanket up to 3-5 bar max. Obviously the storage container must be able to withstand such pressures. At higher temperatures the release of hydrogen is accelerated.

The advantages of the hydrogen-containing fuel include:
Ease of handling liquids
High transport and pumping efficiency during storage
Minimum transport and storage expenses due to high hydrogen content
Low maintenance due to low pressure (no hydrogen embrittlement)

Storage of pure undiluted hydrides caries a high risk of unintended hydrogen release due to moisture or high temperatures.

Hydrogen content may be controlled by determining the hydrogen release of a standard amount of fuel with a standard excess of activator. Activator quality may be determined with a conductivity meter. The hydrogen yield may be monitored by measuring the pressure increase in the reactor from a known amount of the fuel.

Although the preferred activator of the fuel is pure water, due to its high extractable proton content and high reactivity, the temperature range of pure water is limited. For that reason glycol is added, extending the temperature range down to −40° C. Glycol also has extractable protons and therefore is a suitable activator as well.

Further alternative activators include: ammonia and alcohols such as methanol and ethanol. Ammonia is a toxic gas. The alcohols have a lower boiling point than glycol.

Pure water may be produced on site by electro-deionization of water treated with reverse osmosis or by filtering. Usually a deionization system has twin columns in alternate operation, which may back up each other. As an alternative a Pall filter may be used as a back up. The resulting water must have a very low conductance.

The activator may contain acids to facilitate the dissolution of insoluble materials e.g. metal oxides. Heating the activator will accelerate the release of hydrogen. The activator may be re-circulated over a filter to prevent bacterial growth.

The heat released when combining fuel and activator, may be recovered through a heat exchanger and/or a heat pump. This heat does not in any way affect the hydrogen release process. By using a Seebeck element, the recovered heat may be converted to electricity that may be used to power e.g. an electric engine (most efficient) or to recharge a battery. This recovery increases the energy efficiency of the fuel.

The spent fuel contains mineral oil, aluminum hydroxide, and boric acid and glycol borates. Spent fuel may be stored for extended periods of time. Mineral oil and/or solids may separate upon storage. The spent fuel will be collected for recycle. Recycling includes the following steps:
Separation of solid aluminum hydroxide
Drying of aluminum hydroxide to alumina (raw material for aluminum)
Separation of mineral oil for reuse
Conversion of residual borate mixture with methanol (raw material for borohydride), producing glycol for reuse Spent fuel may be recycled without any limitations over and over again. Recycle losses of raw materials are expected to be less than 0.01%.

Below two examples are given for using the fuel system according to the invention:

EXAMPLE 1

Calcium borohydride is dispersed in a medium preferably selected from the group of (mineral) oils, having a density in the range of 0.7-0.8. The colloidal fuel dispersion preferably is a viscous liquid free of volatile organic substances (VOS), i.e. low molecular weight ethers, alcohols and hydrocarbons.

Water of the highest available purity as an activator for the fuel dispersion will give the fastest reaction with the fuel and the lowest amount of impurities.

Preferably, the dispersion and the water are mixed under pressure, in order to flush the oil from the surface of the dispersed solid and exposing the solid surface to water, which will then react to form hydrogen. The interaction between the oil and the solids should be reversible. By adding an emulsifier, the solid surface may be rapidly degreased, allowing an instant reaction with water and instant hydrogen gas formation.

Preferably a slight excess of water is added in order to ensure the complete conversion of all fuel.

A 70% dispersion of calcium borohydride in mineral oil has an energy density of 5.4 kWh/kg. Mixing with an equivalent amount of water (0.7 kg/kg) results in a system energy density of 5.4/1.7=3.2 kWh/kg. This meets the DoE requirement of 3 kWh/kg.

In order to meet the lower operating ambient temperature, a substance such as ethylene glycol (C2H6O2, relative density 1.1, boiling point 197.3° C., molecular mass 62.07) may be added. The general formula for calculating the freezing point depression is:

$$\Delta T = K \cdot \frac{m}{M}$$

wherein:
ΔT=freezing point depression in K,
K=molar freezing point coefficient (1.86 K/mol for glycol in water).
m=mass of dissolved substance in 1.0 kg of water
M=molar mass of dissolved substance (62.07 for glycol)
Rearranging the general formula gives:
Thus a freezing point depression of 20° C. requires the addition of 667.4 g of glycol per kg of water. This dilutes the water by 1000/1667.4=599.3 g water per kg (.about.60%). Having a 70% dispersion of calcium borohydride in mineral oil, an equivalent amount of water (0.7 kg/kg) thus requires 0.7/60%=1.167 kg of the water/glycol winter mixture. The resulting system energy density is 2.5 kWh/kg.

At ambient temperature the vapor pressure of ethylene glycol is 0.5 kPa. Theoretically this would result in hydrogen gas containing 0.5% glycol, which has to be separated from the gas.

Alternatively the activator container may be heated by heating means such as an electrical heating coil.

EXAMPLE II

Aluminum borohydride contains 33.8% hydrogen by weight corresponding to 11.3 kWh/kg. This must be mixed with one and a half times the amount of water to release all hydrogen, resulting in a fuel and activator system hydrogen content of 13.5% by weight with an energy content of 4.5 kWh/kg.

Aluminum borohydride ($Al[BH_4]_3$, Chemical Abstracts 16962-07-5) is a liquid compound having a melting point of −64.5 degrees centigrade and a boiling point of 44.5 degrees centigrade. The vapor pressure of this material will be substantial under ambient conditions, let alone in countries having a higher average ambient temperature.

Since storage of pure undiluted hydrides caries a high risk of unintended hydrogen release due to moisture or high temperatures, precautions are necessary to prevent spontaneous evaporation. In case of aluminum borohydride, an effective precaution may be mixing the aluminum borohydride with an inert carrier fluid, such as a mineral oil. This will elevate the boiling point by an estimated 4° C. per mole per kg aluminum borohydride. At 30% mineral oil, approximately 3 moles of mineral oil are added to 0.7 kg aluminum borohydride. This results in an estimated boiling point elevation of 4×3/0.7=17° C., bringing the boiling point of the mixed fluid to 62° C. and the vapor pressure to 155 mbar at 0° C.

Furthermore, the mixed fluid is stored under a nitrogen blanket in a closed container. By increasing the pressure of the nitrogen blanket up to 3-5 bar, the boiling point will further elevate and the vapor pressure will be depressed. Storage in this way does not affect the intentional release of hydrogen during use. H2FUEL is therefore convinced that the ultimate target for the maximum operating ambient temperature, meaning the stated ambient temperature plus full solar load, set by the US Department of Energy (DOE) at 60° C., can be achieved.

Thus, a 70% dispersion of aluminum borohydride in mineral oil has an energy density of 6.6 kWh/kg. Mixing with water (0.7*1.5 kg/kg) results in a system energy density of 3.2 kWh/kg (9.6% hydrogen).

The amount of water (1.05 kg/kg) for the winter mixture becomes 1.05/60%=1.75 kg, resulting in a system energy density of 2.4 kWh/kg (7.2% hydrogen).

Alternative fuels include lithium borohydride and magnesium borohydride. Assuming a 70% dispersion of these fuels in mineral oil, fuel systems with an energy density of 3.9 kWh/kg (11.8% hydrogen) and 3.6 kWh/kg (10.9% hydrogen) respectively may be provided. Winter mix in that case will give an energy density of 3.3 kWh/kg (9.9% hydrogen) for lithium and 3.1 kWh/kg (9.3% hydrogen) for magnesium.

Typically, the fuel may be obtained by starting from a solid fuel, preferably in powder or granulate form, adding the appropriate amount of (preferably self-dispersing) dispersion medium (and a non-ionic dispersant e.g. a non-ionic surfactant such as nonylphenol ethoxylate containing approximately 8 ethylene oxide units and the terminal OH group is preferably capped with a methyl group to prevent reaction of the OH Group with the fuel.) The target fuel concentration is 70-75%, dispersant concentration 1-10%, preferably 1-5% most preferably 1-2%. The components are mixed in a high shear mixer, such as a rotor stator type mixer. The particle size of the solid fuel particles may be diminished to approximately 1 micron using e.g. a ball mill.

The residual products from the reaction of metal hydrides with water are metal hydroxides $M(OH)_x$, and the residual products from the reaction of metal borohydrides with water are metal borates $M(BO_2)_x$. These residual products are solids, which preferably are dispersed in the dispersion medium. The residual products may be regenerated. Therefore, spent fuel may be collected in a compartment from which it may be removed during a refueling of a fuel tank. The collected spent fuel may be processed in a dedicated processing unit, where the individual components may be separated e.g. by centrifugal separation.

The hydrogen generated from the fuel of the invention, using the device of the invention may be used in a fuel cell for generating electrical power and/or in an internal combustion engine for generating driving power. The hydrogen may also be used in a catalytic converter for generating heat. In all cases hydrogen combines with oxygen from ambient air to form water and heat.

The water formed in a fuel cell may be recovered by providing a third heat exchanger in the outlet of the fuel cell. Ambient air contains 20.95% of oxygen, which at ambient conditions (20° C., 1 bar) corresponds with 8.6 moles. Under the same conditions 1 $m_3$ of air corresponds with 41.05 moles. Conversion of one kg of hydrogen (496 moles) with ambient air at an equal air-to-fuel ratio then requires 28.8 $m_3$ of air, of which 20.95% is consumed. Assuming the fuel cell outlet to be 40° C. at 1 bar, this results in a release of 24.4 $m_3$ of air containing 8.9 kg of water or 367 $g/m_3$. At 60° C., the volume of released air will be 25.9 $m_3$ containing 345 $g/m_3$ of water and at 80° C.: 27.5 $m_3$ containing 325 $g/m_3$ of water.

From table 1 it is clear that at an equal air-to-fuel ratio, a fuel cell, even when operated at 80° C., produces an amount of water that exceeds the air saturation level. For complete conversion of all hydrogen, the air-to-fuel ratio normally is kept between 1.1 and 1.5.

By further increasing the air-to-fuel ratio, the water content may be reduced to the saturation level. At 40° C., this ratio must be increased by a factor of 7.3, at 60° C., it must be increased by a factor of 2.7, and at 80° C., it must be increased by a factor of 1.1. These values correspond very well with the air-to-fuel ratios required for cooling the heat production of the fuel cell, which assuming a fuel cell efficiency of 80%, will amount to 24 MJ.

Cooling the air released from the fuel cell will condense water vapor and prevent excessive vapor losses. A more efficient way of cooling the fuel cell is by using a cooling circuit.

By condensing most of the water produced by the fuel cell, the quantity of water that has to be carried in the tank may be limited to the excess water used for activating the fuel and the losses due to evaporation.

TABLE 1

| | T(° C.) | | | | | | | | | | |
|---|---|---|---|---|---|---|---|---|---|---|---|
| | 20 | 10 | 0 | 10 | 20 | 30 | 40 | 50 | 60 | 70 | 80 |
| $H_2O(g/m^3)$ | 0.9 | 2.2 | 4.8 | 9.4 | 17 | 30 | 51 | 82 | 128 | 195 | 287 |
| H(J/g) 100% RH | −18.6 | −6.1 | 9.4 | 29 | 57 | 97 | 157 | 247 | 379 | 573 | 850 |
| 80% RH | −18.9 | −6.9 | 7.6 | 25 | 49 | 84 | 134 | 207 | 316 | 472 | 696 |
| 60% RH | −19.2 | −7.7 | 5.7 | 22 | 42 | 70 | 110 | 168 | 252 | 372 | 542 |
| 40% RH | −19.5 | −8.5 | 3.8 | 18 | 35 | 57 | 87 | 129 | 188 | 271 | 388 |
| 20% RH | −19.8 | −9.3 | 1.9 | 14 | 27 | 44 | 64 | 90 | 124 | 171 | 234 |

Assuming an air-to-fuel ratio of 1.2 and outlet conditions: 40.degree. C. at 1 bar, the amount of air required per kg of hydrogen equals 34.6 $m_3$. In that case the amount of air released equals 30.5 $m_3$, having a moisture content of 293 $g/m_3$. In order to recover 95% of the water, the moisture content of the outlet must be reduced to 15 $g/m_3$, so the air must be cooled to a temperature of 20° C. This may be accomplished by connecting a plate condenser and a control valve to an air cooling system, for cooling the air from the fuel cell.

Hydrogen may be used in an internal combustion engine for generating driving power. In that case a considerable amount of heat is released in the exhaust of the engine.

The exhaust may be provided with a fourth heat exchanger, for removing the heat released during the combustion of hydrogen. By means of a suitable heat transfer fluid the heat from the fourth heat exchanger may be provided to a thermal electrical module as previously described for recovering part of the heat.

The exhaust may be further cooled for water recovery as previously described. This will require considerable cooling. The exhaust will furthermore contain residues from the combustion of the lubricants used for lubricating the pistons of the engine.

Preferably a filter is provided in the activator line to remove impurities in the water as a result of ambient air used in the conversion of hydrogen.

The electric motor (or motors) of an electric vehicle may in addition to a battery be powered by a fuel cell. In a fuel cell hydrogen (fuel) and air (oxygen) are combined to produce an electrical current and water. In contrast with a battery, which can deliver up to its electrical charge before it goes dead, a fuel cell will continue to generate power, provided fuel and oxygen are supplied.

In order to maximize the vehicle's driving range, the energy onboard, including any braking energy, has to be used efficiently. To that effect, the vehicle has to be provided with an advanced power management system, which selects and controls the optimum combination of power sources to drive the vehicle under varying electrical loads.

The voltage of a fuel cell depends on the load, the supply of hydrogen and the controlled current. Power electronics controlled by algorithms are used to regulate the power output of the engine by regulating the voltage that is delivered to the electric motor based on the load variation required by the user and the current fuel cell output.

The power output of a fuel cell has an optimum near full load. Therefore the capacity of a fuel cell system for varying loads is preferably provided by a discrete number of stacks, each having e.g. 10% of the total capacity, such that 80% of the power may be controlled by individually switching 8 stacks on or off. Two further stacks preferably are provided with a fully controlled hydrogen flow, making 20% of the power continuously controlled.

If the load increases from 0 up to 15% of the total capacity, the hydrogen flow of the 2 adjustable stacks is controlled and if necessary adjusted. If the load increases to a value >15%, an additional fuel cell stack is switched on and the hydrogen flow of one adjustable stack is reduced in proportion. At each further load increment of 10%, this sequence is repeated until all stacks are in operation.

When operating the accelerator, a present day fuel cell will typically have a delay of the order <5 seconds in switching power on or off. The resulting power gap during acceleration has to be compensated by alternative power sources such as a battery and/or a capacitor fed by a kinetic energy recovery system (KERS) and/or excess power.

Considering the 200 kW electric power of a TESLA Roadster, which is currently supplied by a 375 V battery pack having a capacity of 53 kWh, the maximum power translates to a maximum current of 533 A. The capacity translates to 141 Ah, which at 533 A may be delivered for a maximum period of 16 minutes.

If, for instance, the TESLA would be equipped with e.g. 10 fuel cell stacks of 20 kW each, then within 5 seconds after switching the nominal power would be available, during which time the battery has to provide the maximum current. For practical purposes, including battery life and operational smoothness, the battery may have a design capacity of e.g. 10% of its current capacity.

The braking energy of an electric vehicle is preferably recovered by using the electric motor as a generator (KERS). The generated electricity may be stored in a battery and/or a capacitor later use. A power controller preferable controls the charging and discharging cycles of the battery and capacitor. The battery charge is preferably held between 20% and 80% of full charge. The capacitor is used with priority for charging and discharging.

The invention claimed is:

1. A method for generating hydrogen, $H_2$, comprising the steps of:
   a) providing a metal borohydride, $M(BH_4)_x$, as a hydrogen carrier, wherein M is a metal and x denotes a valence value of the metal;
   b) providing water having a conductance value below 0.5 µS as an activator fluid;
   c) bringing the hydrogen carrier and the activator fluid together and allowing the hydrogen carrier and the activator fluid to react to provide hydrogen, $H_2$.

2. The method according to claim 1, wherein the hydrogen carrier is provided in a hydrogen carrier fluid comprising molecules or particles of the hydrogen carrier dissolved or dispersed in an inert fluid medium.

3. The method according to claim 2, wherein the hydrogen carrier fluid and the activator fluid are injected into a reaction chamber, and the hydrogen carrier fluid and the activator fluid are injected into the reaction chamber in order to cause an intensive mixing of the molecules or particles of the hydrogen carrier with the activator fluid.

4. The method according to claim 3, wherein the hydrogen carrier fluid and the activator fluid are injected under high pressure.

5. The method according to claim 2, wherein a particle size of particles of the hydrogen carrier is 10 microns or smaller.

6. The method according to claim 2, wherein a particle size of particles of the hydrogen carrier is about 1 micron or smaller.

7. The method according to claim 2, wherein the inert fluid medium is a fluid or a combination of fluids selected from the group consisting of mineral oils, copolymers of ethylene and propylene, poly(alpha)olefins and ether alkoxylates.

8. The method according to claim 2, wherein a concentration of molecules of the hydrogen carrier in the inert fluid medium is at least 60%.

9. The method according to claim 2, wherein a concentration of molecules of the hydrogen carrier in the inert fluid medium is within the range of 70% to 75%.

10. The method according to claim 2, wherein a viscosity of the hydrogen carrier fluid is 1 to 50 times that of water at room temperature.

11. The method according to claim 2, wherein a viscosity of the hydrogen carrier fluid is 1 to 2 times that of water at room temperature.

12. The method according to claim 1, wherein the metal, M, of the hydrogen carrier is selected from the group consisting of Li, Na, Be, Mg, Ca and Al.

13. The method according to claim 1, wherein the hydrogen carrier comprises $Na(BH_4)_2$, $Ca(BH_4)_2$ and/or $Al(BH_4)_3$.

14. The method according to claim 1, wherein the water is purified, demineralised, treated with reverse osmosis and/or filtered by an electrostatic filter.

15. The method according to claim 1, wherein the water is recycled water from a fuel cell.

16. A binary fuel for generating hydrogen, $H_2$, comprising a metal borohydride, $M(BH_4)_x$, as a hydrogen carrier and water having a conductance value below 0.5 μS as an activator fluid, wherein M is a metal and x denotes a valence value of the metal.

17. The fuel according to claim 16, wherein the hydrogen carrier is provided in a hydrogen carrier fluid comprising molecules or particles of the hydrogen carrier dissolved or dispersed in an inert fluid medium.

18. The fuel according to claim 17, wherein a particle size of particles of the hydrogen carrier is 10 microns or smaller.

19. The fuel according to claim 17, wherein a particle size of particles of the hydrogen carrier is about 1 micron or smaller.

20. The fuel according to claim 17, wherein the inert fluid medium is a fluid or a combination of fluids selected from the group consisting of mineral oils, copolymers of ethylene and propylene, poly(alpha)olefins and ether alkoxylates.

21. The fuel according to claim 17, wherein a concentration of molecules of the hydrogen carrier in the inert fluid medium is at least 60%.

22. The fuel according to claim 17, wherein a concentration of molecules of the hydrogen carrier in the inert fluid medium is within the range of 70% to 75%.

23. The fuel according to claim 17, wherein the viscosity of the hydrogen carrier fluid is from 1 to 50 times that of water at room temperature.

24. The fuel according to claim 17, wherein the viscosity of the hydrogen carrier fluid is 1 to 2 times that of water at room temperature.

25. The fuel according to claim 16, wherein the metal, M, of the hydrogen carrier is selected from the group consisting of Li, Na, Be, Mg, Ca and Al.

26. The fuel according to claim 16, wherein the hydrogen carrier comprises $Na(BH_4)_2$, $Ca(BH_4)_2$ and/or $Al(BH_4)_3$.

* * * * *